(12) United States Patent
Yamashita et al.

(10) Patent No.: US 10,558,629 B2
(45) Date of Patent: Feb. 11, 2020

(54) INTELLIGENT DATA QUALITY

(71) Applicant: ACCENTURE GLOBAL SOLUTIONS LIMITED, Dublin (IE)

(72) Inventors: Sabrina Yamashita, Leatherhead (GB); Armando Martines Neto, London (GB); Vivek Likhar, Swindon (GB); Acyr Da Luz, Palo Alto, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 16/424,001

(22) Filed: May 28, 2019

(65) Prior Publication Data

US 2019/0370233 A1    Dec. 5, 2019

Related U.S. Application Data

(60) Provisional application No. 62/677,431, filed on May 29, 2018.

(51) Int. Cl.
| | | |
|---|---|---|
| *G06F 16/215* | (2019.01) | |
| *G06F 16/25* | (2019.01) | |
| *G06F 16/903* | (2019.01) | |
| *G06N 20/00* | (2019.01) | |

(52) U.S. Cl.
CPC ......... *G06F 16/215* (2019.01); *G06F 16/254* (2019.01); *G06F 16/258* (2019.01); *G06F 16/903* (2019.01); *G06N 20/00* (2019.01)

(58) Field of Classification Search
CPC .......... G06N 5/025; G06N 20/00; G06N 3/08; G06N 3/088; G06K 9/66; G06F 16/215; G06F 16/258; G06F 16/254; G06F 16/25; G06F 16/903
See application file for complete search history.

(56) References Cited

U.S. PATENT DOCUMENTS

| | | |
|---|---|---|
| 6,615,220 B1 | 9/2003 | Austin et al. |
| 2005/0108631 A1* | 5/2005 | Amorin .................. G06Q 10/00 715/234 |
| 2012/0150825 A1* | 6/2012 | Chaturvedi ........... G06F 16/217 707/692 |
| 2012/0330911 A1* | 12/2012 | Gruenheid ............ G06F 16/214 707/694 |

(Continued)

*Primary Examiner* — David T. Brooks
(74) *Attorney, Agent, or Firm* — Mannava & Kang, P.C.

(57) ABSTRACT

Examples of an intelligent data quality application are defined. In an example, the system receives a data quality requirement from a user. The system obtains target data from a plurality of data sources. The system implements an artificial intelligence component sort the target data into a data cascade. The data cascade may include a plurality of attributes associated with the data quality requirement. The system may evaluate the data cascade to identify a data pattern model for each of the attributes. The system may implement a first cognitive learning operation to determine a mapping context from the data cascade and a conversion rule from the data pattern model. The system may establish a data harmonization model corresponding to the data quality requirement by performing a second cognitive learning operation. The system may generate a data cleansing result corresponding to the data quality requirement.

20 Claims, 21 Drawing Sheets

(56) References Cited

U.S. PATENT DOCUMENTS

| | | | |
|---|---|---|---|
| 2013/0166515 A1* | 6/2013 | Kung | G06Q 10/063 |
| | | | 707/690 |
| 2014/0156806 A1* | 6/2014 | Karpistsenko | G06F 16/25 |
| | | | 709/219 |
| 2014/0279295 A1* | 9/2014 | Meyer | G06F 16/254 |
| | | | 705/28 |
| 2015/0106341 A1* | 4/2015 | Gould | G06F 16/252 |
| | | | 707/687 |
| 2016/0004742 A1* | 1/2016 | Mohan | G06F 16/2365 |
| | | | 707/694 |
| 2016/0070725 A1* | 3/2016 | Marrelli | G06F 16/215 |
| | | | 707/692 |
| 2016/0154830 A1* | 6/2016 | Papotti | G06F 16/25 |
| | | | 707/692 |
| 2016/0232216 A1* | 8/2016 | Wurzer | G06F 16/258 |
| 2018/0039680 A1* | 2/2018 | Nelke | G06F 16/254 |
| 2018/0373579 A1* | 12/2018 | Rathore | G06F 11/006 |
| 2018/0373781 A1* | 12/2018 | Palrecha | G06F 9/547 |

\* cited by examiner

INTELLIGENT DATA QUALITY

PRIORITY CLAIM

This application claims priority to U.S. Provisional Patent Application No. 62/677,431 filed on May 29, 2018, the disclosure of which is incorporated by reference in its entirety.

BACKGROUND

The importance of enterprise data management has increased significantly in recent times. Currently, systems lack the intelligence to detect data errors that do not conform to business rules or other rules and the ability to regulate data quality—it relies heavily on human intervention to identify business rules. As a result, bad data in a system can negatively impact enterprise applications or any business processes that utilize the data stored in the system.

Currently, there are tools that perform rudimentary profiling of data, providing out-of-the-box outputs like minimum, maximum, medium, average, most frequent word, field pattern, and other such data quality parameters. However, these tools do not come with out-of-the-box business rules. Such rules have to be provided by the business users. A common issue may be that the business has not documented these rules or the personnel knowledgeable about such rules may not have documented the rules. The existing data tools in the market depend on an end user to analyze and provide the mapping between source and target systems. This process of providing business rules to profile data depends on a manual analysis of data fields and can be time consuming when there are multiple sources/databases as part of a complex system landscape. This task may be more challenging when the source is a manual spreadsheet or unstructured data. Similar challenges may be encountered in profiling data to be migrated from one system to another. Presently, a user may rely heavily on the business to provide the correct value of a data or to identify an issue with the data.

Bad/low quality data may compromise the accuracy of the output of systems. For example, if the data quality of addresses stored in the production database system is low, then addresses may be incorrect or may be rendered unusable for accurately determining delivery locations, calculating taxes based on location, and performing other such functional activities. Furthermore, each of the analytical tools applied to the series of data may suppress any critical data for the purpose of analysis, thereby leading to a high probability of missing critical information and generating inaccurate conclusions and inferences. Furthermore, such methods may not consider real-time factors while generating inferences. Unfortunately, organizations operate in an "always on" environment, thereby making the process of analysis and data management using such methods difficult and inaccurate.

There is therefore a requirement for an intelligent data harmonization model, that may detect data patterns from various data sources and automatically generate insights that may be converted into business rules that could be used to check data quality. There is also a requirement for an intelligent data harmonization model, that may consider future factors, and complex organizational scenarios along with taking into account real-time factors for the generation of specific modeling details, thereby assisting with real-time decisions. Furthermore, there is a requirement for a data harmonization model, which can evolve continuously based on a changing data paradigm.

Accordingly, a technical problem with the currently available processes that ensure data quality is that they may be inefficient, inaccurate, and/or not scalable. These data quality processes may also rely heavily on the business user to perform manual tasks during the mapping, profiling and cleansing activities. There is therefore a requirement for an artificial intelligence (AI)-based data quality system, which may perform AI and machine learning based data profiling, data mapping, and data cleansing.

DETAILED DESCRIPTION

Figure 1:
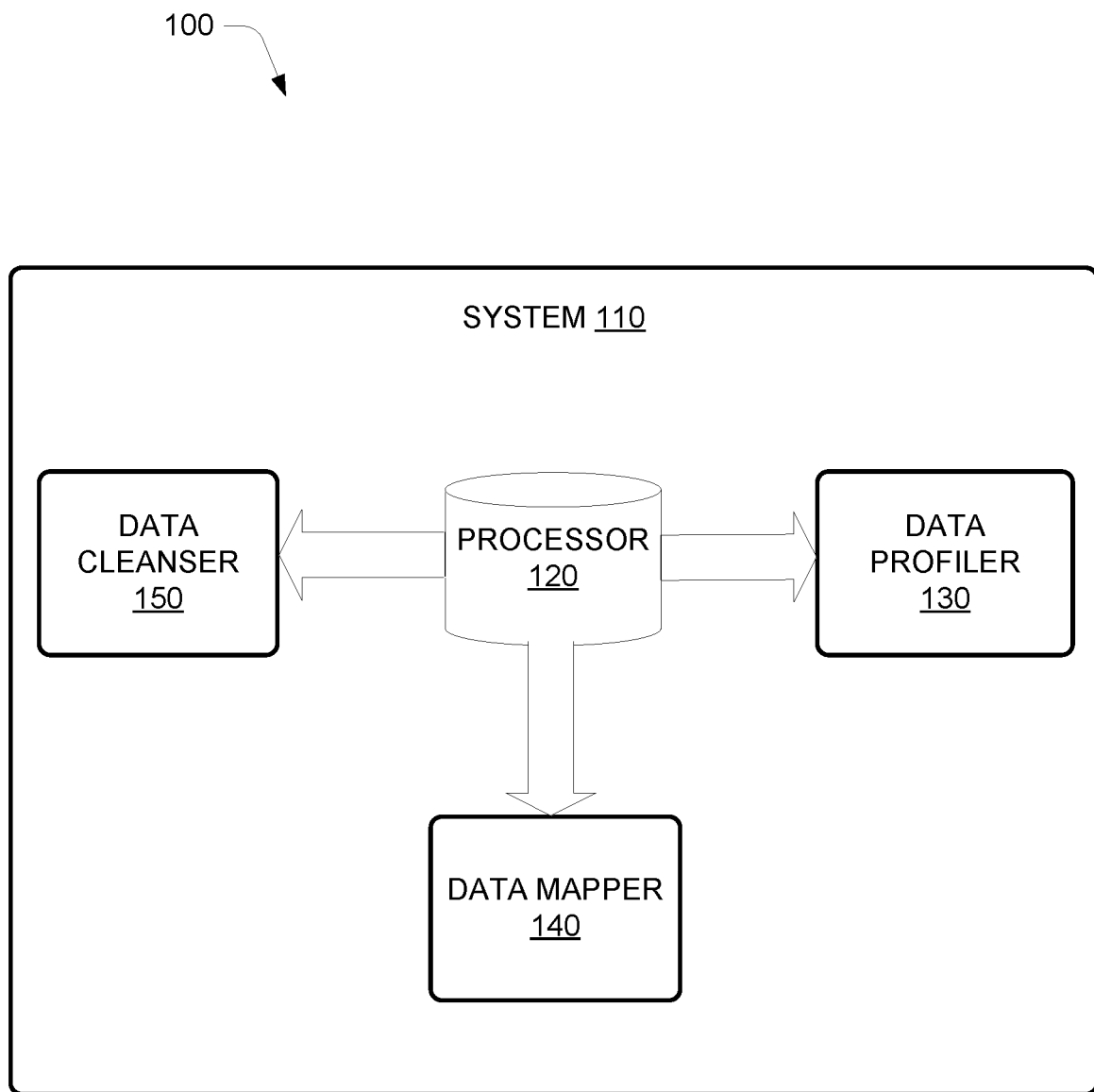
FIG. 1 illustrates a diagram for an intelligent data quality application, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes systems and methods for intelligent data quality (IDQ) processing. The intelligent data quality application (referred to as "system") may be used for Artificial Intelligence ("AI") and machine learning based data profiling, data mapping, and data cleansing. Each of these components may be used by itself or in any combination with the other components to improve data quality. For example, the system may perform an AI-based data profiling to detect data patterns and automatically generate potential rules that can be used to check data quality. The system may also perform automated data mapping to map fields of a data source to fields of a target dataset. The system may also perform automated data cleansing to correct data quality errors which may be detected according to the auto-generated rules. Data cleansing may include changing data loaded from a data source and/or populating empty fields or changing null values.

The system may include a processor, a data profiler, a data mapper, and a data cleanser. The processor may be coupled to the data profiler, the data mapper, and the data cleanser. The data profiler may be configured to receive a query from a user. The query may indicate a data quality requirement relevant for data management operations. The data profiler may obtain target data from a plurality of data sources associated with the data quality requirement. The target data may also be referred to as profiled data after the target data may have been obtained by the data profiler. The data profiler may implement an artificial intelligence component to sort the profiled data into a data cascade. The data cascade may include a plurality of attributes identified by the artificial intelligence component for the profiled data. In an example, each of the attributes from the plurality of attributes may be associated with a data harmonizing requirement. In an example embodiment, data harmonization may refer to ensuring that the data is usable across different systems. The data profiler may implement the artificial intelligence component to evaluate the data cascade to identify a data pattern model for each of the attributes from the plurality of attributes. The data pattern model may be a pattern detected by the system from the data assimilated from a plurality of data sources and collated into the data cascade through combining various parameters from the identified parameter set. In an example, the data profiler may electronically obtain a consent from the user regarding the establishment of the data pattern model. The data profiler may modify the data pattern model until the consent from the user may be obtained regarding aptness of the data pattern model. In an example, the system may use various algorithms and technical modules as part of the artificial intelligence component for determining the data pattern model.

The data mapper may implement a first cognitive learning operation to determine at least one mapping context associated with the data quality requirement from the data cascade and the data pattern model. The mapping context may include a pattern value from the data pattern model and at least one attribute from the data cascade. The mapping context may include a set of attributes, which may be potentially similar and also conforming to the data pattern model. The data mapper may determine a conversion rule from the data pattern model for each of the mapping context associated with the data quality requirement. In an example, the data mapper may determine a different conversion rule from the data pattern model for each mapping context identified by the data mapper from the data pattern model. In an example, the data mapper may electronically obtain a consent from the user regarding the establishment of the conversion rule. The data mapper may modify the conversion rule until the consent from the user may be obtained regarding aptness of the conversion rule. In an example, the first cognitive learning operation may include various algorithms and technical modules, which may be used for determination of the mapping context and the conversion rule.

The data cleanser may obtain data pattern model for each attribute associated with the data quality requirement. The data cleanser may obtain the conversion rule determined for each of the mapping context associated with the data quality requirement. The data cleanser may establish a data harmonization model corresponding to the data quality requirement by performing a second cognitive learning operation on the obtained data pattern model domain and the obtained conversion rule. The data cleanser may obtain a third consent from the user regarding the establishment of the data harmonization model. The system may modify the data harmonization model until the consent from the user may be obtained regarding aptness of the data harmonization model. The data cleanser may generate a data cleansing result corresponding to the data quality requirement. The data cleansing result may include the data harmonization model relevant for a resolution to the query. In an example, the data harmonization model may further include a harmonized dataset comprising at least a part of the target data from the plurality of sources collated through the implementation of the artificial intelligence component, the first cognitive learning operation, and the second cognitive learning operation. The data harmonization model may further include a data harmonization index indicative of a level of harmonization achieved in the at least a part of the target data through the implementation of the artificial intelligence component, the first cognitive learning operation, and the second cognitive learning operation.

In an example, data cleansing result is generated as an electronic document in response to the query of the user. In an example, the data cleanser may provide evidence supporting the data harmonization model. In an example, the system may establish a profiling library, by associating the plurality of attributes included in the data cascade, the mapping context for each attribute, the conversion rule for each mapping context, and the data harmonization model with the data quality requirement. The system may further deploy the profiling library for validation of the data harmonization model. In an example, the second cognitive learning operation may include various algorithms and technical modules, which may be used for intelligent data cleansing operations and establishment of the data harmonization model. In an example, the data harmonization model may be established by performing intelligent data cleansing operations (explained later in the document) on the data pattern model based on the mapping context and the conversion rules generated for a particular dataset. In an example, the system may modify any of the data pattern model, the conversion rule, and the data harmonization model for obtaining the first consent, the second consent, and the third consent respectively from the user The embodiments for the data quality requirement presented herein are exemplary in nature and should be treated as such. For the sake of brevity and technical clarity, the description of the intelligent data quality application may be restricted to few exemplary embodiments, however, to a person skilled in the art it should be clear that the system may be used for the fulfillment of various data quality requirements other than those mentioned hereinafter. The system may be used for modeling and mapping data into a single dataset using various datasets as an input. The system may obtain data from various data sources and apply techniques such as machine learning and artificial intelligence for synchronizing data from different sources as per a common pattern. The system may generate various rules for a particular data set for performing the synchronization. The synchronized data may be mapped according to similar attributes using artificial intelligence and machine learning operations. The data may also be cleansed using intelligent data cleansing operations by generating various data cleansing rules for more effective mapping and profiling for data modeling. The system may be configured so that the user may modify the rules and procedures used for data mapping, data profiling, and data cleansing. In an example, the system may generate a set of rules for a particular data set. The set of rules may be different for data profiling, data mapping, and data cleansing operations, which may be performed by the system on the data set. In accordance with various embodiments of the present disclosure, the system may be used to generate rules for data harmonization based on the target data received by the system.

FIG. 1 illustrates a system for an intelligent data quality application 110 (referred to as system 110 hereinafter), according to an example implementation of the present disclosure. In an example, the system 110 may include a processor 120. The processor 120 may be coupled to a data profiler 130, a data mapper 140 and a data cleanser 150.

In accordance with an embodiment of the present disclosure, the data profiler 130 may be configured to receive a query from a user. The query may indicate a data quality requirement associated with at least one of a process, an organization, and an industry relevant for operations. In an example, the data quality requirement may indicate a requirement, which may refer to a purpose of data modeling. For example, during the planning phase of a major Enterprise Resource Planning (ERP) consolidation programme, there may a need to understand a data model from different legacy systems before determining a to-be data cleansing model. This is to say that an organization may be required to synchronize multiple data sources into a single data model and maintain the same data model for various future data modeling purposes. In an example, the legacy systems may be multiple SAP® ERP Central Component (SAP® ECC) and other non-SAP® legacy systems to be mapped to a new S/4HANA system (SAP®'s ERP for large enterprises). The system 110 may be deployed for consolidating data from various legacy systems and may be used to determine a single data model, which may be maintained for data management purposes. The system 110 may assist with data migration from various source datasets (also referred to as "Source System Data") to an organizational dataset or a target dataset. The target dataset may be the dataset generated through the application of the system 110 for intelligent data cleansing. The data profiler 130 may profile the target system data for understanding the to-be data model. The data profiler 130 may profile the source system data to identify data quality issues prior to migrating to target. In an example, the data mapper 140 may be deployed to map the source data to the target data. In an example, the system 110 may be used various BAU (business as usual) operations. For example, production data for an organization may have data quality issues, but what issues may be and how inferior the data quality may remain unknown. In such cases, the data cleansing may be time-consuming and may be very manual. The system 110 may assist with data cleansing and profiling for a low-quality data set for efficient data management. The embodiments for the data quality requirement presented herein are exemplary in nature and should be treated as such. For the sake of brevity and technical clarity, the description of the intelligent data quality application may be restricted to few exemplary embodiments, however, to a person skilled in the art it should be clear that the system 110 may be used for the fulfillment of various data quality requirements other than those mentioned hereinafter.

The data profiler 130 may be configured to receive a query from a user. The query may indicate a data quality requirement relevant for data management operations. The data profiler 130 may obtain target data from a plurality of data sources associated with the data quality requirement. In an example, the target data may further comprise researching various factors such as, for example, features of a product or service, benefits of a product or service, cost of a product or service, availability of a product or service, location of a product or service, delivery method of a product or service, information regarding updates in a product or service, innovation assessment for a product or service, risk assessment for a product or service, technology assessment for a product or service, an existing collaboration for a product or service, production data for a product, marketing data for a product, analysis of a particular services on various indices and the like. In an example, the target data may be a set of historical data stored in the system 110, which may be accessed by the system 110 for processing the data quality requirement. In accordance with an embodiment of the present disclosure, the plurality of data sources may include, for example, various datasets across the Internet, news articles, various datasets maintained by various external organizations, various internal datasets comprising historical data that may be maintained by an organization.

The data profiler 130 may implement an artificial intelligence component to sort the target data into a data cascade. The artificial intelligence component may be one of a data extractor, a data classifier, a data associator, a data comparer, a relationship extractor, and a dependency parser and the like. The data cascade may be a series of datasets identified from the source dataset wherein information may be stored in an sequential manner. The data cascade may include a plurality of attributes identified by the artificial intelligence component for the target data. In an example, each of the attributes from the plurality of attributes may be associated with the data quality requirement. Each of the attributes from the plurality of attributes may include a measurable factor, which may be forming one of a set that may define a condition for processing the data quality requirement. In an example, the data cascade may include multiple measurable factors in the form of multiple attributes that would have an impact on the purpose of the data quality requirement. The data cascade may be arranged by the artificial intelligence component such that information about an attribute from the plurality of attributes may be linked to another attribute from the plurality of attributes in a sequential manner. In an example, various patterns, trends, and fluctuations in the source system data may be profiled by the data profiler 130 into the data cascade. The data cascade may facilitate data assimilation from various sources into a single target dataset through categorization of various attributes from the plurality of attributes. The attributes may be identified by the artificial intelligence component.

For example, the purpose of the data quality exercise may be to understand a data model from the different legacy systems before determining a to-be data model for developing a particular project datasets management system. The data profiler 130 may search through the plurality of data sources and identify measurable factors, which may have an impact on the requirement of various legacy systems. For example, the data profiler 130 may identify different legacy systems like SAP® ECC, or S/4HANA system which may be in the market and may be serving the different domains and industries, through searching various datasets over the Internet. The data profiler 130 may access the historical data stored in the system 110 for identifying various categories, which may be used for classification of various legacy systems as per an organizational requirement. The data profiler 130 may identify a particular pattern or trend for an industry or for a particular data quality requirement. The data profiler 130 may research different datasets, which may be relevant to the industry and serve the needs of the market. Further, the data profiler 130 may identify other measurable factors (not mentioned herein), which may be relevant for processing the data quality requirement (explained further in detail with more exemplary embodiments by way of subsequent Figs.).

In an example, the plurality of attributes may be identified through application of a set of category intelligence operations on at least one domain from the data cascade. The category intelligence operations may include identification of all measurable factors associated with the purpose of the data quality requirement (further explained by way of subsequent Figs.). In an example, the system 110 may identify a new plurality of attributes for processing each data quality requirement. In an example, the plurality of attributes identified for a data quality requirement may include at least one set that has been pre-set by a user.

The data profiler 130 may implement the artificial intelligence component to evaluate the data cascade to identify a data pattern model for each of the attributes from the plurality of attributes. As mentioned above, various trends, patterns, and fluctuations from the source system data may be stored in the data cascade in the form of various datasets. The artificial intelligence component may evaluate each of the datasets present in the data cascade pertaining to the data quality requirement for identification of a pattern linking various datasets. The data pattern model may include a model for linking various datasets with each other in a sequential manner, wherein one dataset may lead to another when a set of specified conditions defined by the data pattern model may be fulfilled. In an example, the artificial intelligence component may deploy various algorithms and technical modules for identifying the data cascade and determining the data pattern model. The data pattern model may be a pattern detected by the system from the data assimilated from a plurality of data sources and collated into the data cascade through combining various parameters from the identified plurality of attributes. The data pattern model may include generation of rules to profile data from a dataset and to auto-generate mapping and transformation rules from the profiling. For example, a dataset may be identified, which may pertain to the data quality requirement and may be required to be formulated into a dataset through the generation of various mapping and transformation rules. In an example, the dataset may be obtained from a source system data that is already stored in the system 110. The dataset may include data that may be trusted. For example, the dataset to be profiled may be pre-checked to determine that it may be accurate.

To perform the data profiling as mentioned above, the data profiler 130 may implement an artificial intelligence component. Additionally, the artificial intelligence component may include machine learning functions to analyze text and determine patterns which may be converted into rules for mapping and transformation. The rules for mapping and transformation, may, for example, include cleansing rules for cleansing low-quality data as mentioned above. For example, the data profiler 130 may identify combinations of attributes of the dataset being analyzed for the establishment of the data pattern model. The data pattern model may be used for generation of the rules and organizational statements for the rules. The datasets present in the data cascade may include data in one or more tables, which may be constituted as part of the data cascade as mentioned above. The data profiler 130 may establish the data pattern model by identifying patterns of values in a row or identify patterns between rows or between tables from the data cascade. In an example, the system may use various algorithms and technical modules as part of the artificial intelligence component for determining the data pattern model (explained in detail by way of subsequent Figs.). In an example, the data pattern model may be based on attributes from the data cascade, which may be classified by the data profiler 130 as being most important for processing the data quality requirement. As mentioned above, the system 110 may analyze a variety of factors critical to data quality and may also analyze outlier data for processing the data quality requirement. Accordingly, the system 110 may identify at least one attribute from the data cascade as being critical for the establishment of the data pattern model (explained in detail by way of subsequent Figs. along with exemplary embodiments). In an example, the system 110 may identify a new set of the data pattern model for processing each data quality requirement. In an example, the data pattern model identified for a data quality requirement may include at least one attribute that has been pre-set by a user.

In an example, the data profiler 130 may electronically obtain consent from the user regarding the establishment of the data pattern model. The data profiler 130 may modify the data pattern model until the consent from the user may be obtained regarding aptness of the data pattern model. The system 110 may be configured to obtain user input for validating rules, which have been generated thus far. For example, a pattern identified by the data pattern model may be displayed to the user along with a statement describing the pattern. Also, a percentage of records that conform to the pattern may be displayed to the user. The user may validate the pattern based on the percentage of records that conform to the rule. Also, the user feedback may be provided to the machine learning functions of the artificial intelligence component to improve the accuracy of pattern identification and rule generation.

In an example, the data profiler 130 may update the target data simultaneously as it is acquired by the plurality of data sources, thereby making the system 110 a data cleansing model based upon real-time data. The data profiler 130 may receive target data from the plurality of data sources. The data presented by the plurality of data sources may be updated continuously, and such an update may be critical for processing a data quality requirement in some cases. The data profiler 130 may be configured to acquire any update in target data pertaining to a specific data quality requirement from the plurality of data sources. Such an acquisition may facilitate the effective processing of the data quality requirement (explained further by subsequent sections).

The system 110 may further include the data mapper 140 coupled to the processor 120. The data mapper 140 may implement a first cognitive learning operation to determine at least one mapping context associated with the data quality requirement from the data cascade and the data pattern model. The mapping context to include a pattern value from the data pattern model and at least one attribute from the data cascade. As mentioned above the data cascade may include the plurality of attributes arranged in a sequential manner and the data pattern model may include patterns of values in a row, or identify patterns between rows or between tables from the data cascade. The data mapper 140 may identify an attribute from the plurality of attributes and map the same against relevant pattern values from the data pattern model. For example, if one of the attributes from the plurality of attributes associated with the data quality requirement may be a product category, wherein various products manufactured or purchased by an organization may have been profiled by the data profiler 130. The data cascade may further include various related attributes like a list of product names for each of the product categories, prices for each of the products for each of the product categories, and the like. The relevant data pattern model would include various patterns of values in a row, column or a table related to data regarding various products categories and also data regarding various attributes related to the product category attribute. The data mapper 140 may select a single attribute, for example, the product category from the data cascade, and assimilate related pattern values from the related data pattern model for generating the mapping context for product category mapping.

The data mapper 140 may determine a conversion rule from the data pattern model for each of the mapping context associated with the data quality requirement. For example, the mapping may be identified as the product category mapping. The data mapper 140 may identify at one conversion rule for mapping data from various source system datasets for converting data assimilated from there based on, for example, the mapping context of product categories. In an example, the data mapper 140 may determine a different conversion rule from the data pattern model for each mapping context identified by the data mapper 140 from the data cascade.

The data mapper 140 may obtain consent from the user regarding the establishment of the conversion rule. The data mapper 140 may modify the conversion rule until the consent from the user may be obtained regarding aptness of the conversion rule generated thus far. The system 110 may be configured to obtain user input for validating rules, which have been generated thus far. For example, a conversion rule identified by the data mapper 140 may be displayed to the user along with a statement describing the conversion rule. Also, a percentage of records that conform to the conversion rule may be displayed to the user. The user may validate the conversion rule based on the percentage of records that conform to the rule. Also, the user feedback may be provided to the machine learning functions of the first cognitive learning operation component to improve the accuracy of rule generation.

In an example, the first cognitive learning operation may include various algorithms and technical modules (explained in detail by way of subsequent Figs.), which may be used for determination of the mapping context and the conversion rule.

As mentioned above, the system 110 may further include the data cleanser 150. The data cleanser 150 may obtain data pattern model for each attribute associated with the data quality requirement. In an example, the data cleanser 150 may obtain the data pattern model from the data profiler 130. The data cleanser 150 may obtain the conversion rule determined for each of the mapping context associated with the data quality requirement. In an example, the data cleanser 150 may obtain the conversion rule from the data mapper 140. The data cleanser 150 may establish a data harmonization model corresponding to the data quality requirement by performing a second cognitive learning operation on the obtained data pattern model domain and the obtained conversion rule. The data harmonization model may include a set of rules and conditions which may be deployed by the system for data sensitization and synchronization after data mapping and data profiling has been completed by the system 110. For example, the datasets obtained through the data pattern model and the conversion rules may include some outliers and some data may not conform to a synchronized style of documentation. The data cleanser 150 may deploy the second cognitive learning operation to clean the data and generate the target datasets in response to the data quality requirement. In an example, the data harmonization model may further include a harmonized dataset comprising at least a part of the target data from the plurality of sources collated through the implementation of the artificial intelligence component, the first cognitive learning operation, and the second cognitive learning operation. The harmonized data set may have been generated from various source system datasets and synchronized into a single dataset by application of the artificial intelligence component, the first cognitive learning operation, and the second cognitive learning operation.

The data cleanser 150 may obtain consent from the user regarding the establishment of the data harmonization model. The system 110 may modify the data harmonization model until the consent from the user may be obtained regarding aptness of the data harmonization model. In an example, the data cleanser 150 may modify the data harmonization model until the consent from the user may be obtained regarding aptness of the data harmonization model generated thus far. The system 110 may be configured to obtain user input for validating rules, which have been generated thus far. For example, a data harmonization model identified by the data cleanser 150 may be displayed to the user along with a statement describing the data harmonization model. Also, a percentage of records that conform to the data harmonization model may be displayed to the user. The user may validate the data harmonization model based on the percentage of records that conform to the data harmonization model. Also, the user feedback may be provided to the machine learning functions of the second cognitive learning operation component to improve the accuracy of rule generation.

The data harmonization model may further include a data harmonization index indicative of a level of harmonization achieved in the at least a part of the target data through the implementation of the artificial intelligence component, the first cognitive learning operation, and the second cognitive learning operation. For example, the data harmonization index may indicate the quality of data harmonization achieved by the application of various machine learning tools and techniques on the source system data. As mentioned above, the system 110 may be used to process low-quality data into high-quality data. The data harmonization index may quantitatively measure the quality of target data achieved through the selection of, a particular data pattern model, a particular conversion rule, and a particular data harmonization model by the artificial intelligence component, the first cognitive learning operation, and the second cognitive learning operation respectively. The user of the system 110 may modify any of the data pattern model, the conversion rules, and the data harmonization model based on the data harmonization index. For example, a low value of the data harmonization index may indicate low-quality data processing and a requirement for change in at least of one of the data pattern model, the conversion rules, and the data harmonization model.

The data cleanser 150 may generate a data cleansing result corresponding to the data quality requirement, the data cleansing result comprising the data harmonization model relevant for a resolution to the query. In an example, the data cleansing result may be generated as an electronic document in response to the query of the user. In an example, the data cleanser 150 may provide evidence supporting the data harmonization model. In an example, the second cognitive learning operation may include various algorithms and technical modules, which may be used for intelligent data cleansing operations and establishment of the data harmonization model (explained by way of subsequent Figs.). In an example, the data harmonization model may be established by performing intelligent data cleansing operations on the data pattern model based on the mapping context and the conversion rules generated for a particular dataset.

In an example, data profiler 130 may establish a profiling library, by associating the data pattern model and the identified plurality of attributes with the data quality requirement. For example, system 110 may identify a plurality of attributes for a particular data quality requirement. Additionally, the system would also identify a set of data pattern model for that particular data quality requirement. The data profiler 130 may be configured to associate the identified plurality of attributes and the identified data pattern model for that specific data quality requirement. The system 110 may store the identified plurality of attributes with the associated data pattern model in the profiling library. The system 110 may access the profiling library for using the identified plurality of attributes with the associated data pattern model for processing a similar data quality requirement in future (further explained by way of FIG. 2 and FIG. 3).

One of ordinary skill in the art will appreciate that the structure of system 110 disclosed above is for example purposes only. Any single component of the system 110 may be used to satisfy the data quality requirement. For example, in an example embodiment, based on the particular data quality requirement, only data profiler 130 may be needed to achieve the data quality required by a user of system 110. In other embodiments, a combination or sub combination of the components may also be used to achieve the data quality desired by a user of system 110. For example, in an alternative embodiment based on the data quality requirement of a user, data profiler 130 in conjunction with data mapper 140 may be used to achieve the data quality desired by the user of system 110. In yet another alternative embodiment, data profiler 130, data mapper 140, and data cleanser 150 may operate in combination to achieve the appropriate data quality results.

Figure 2:
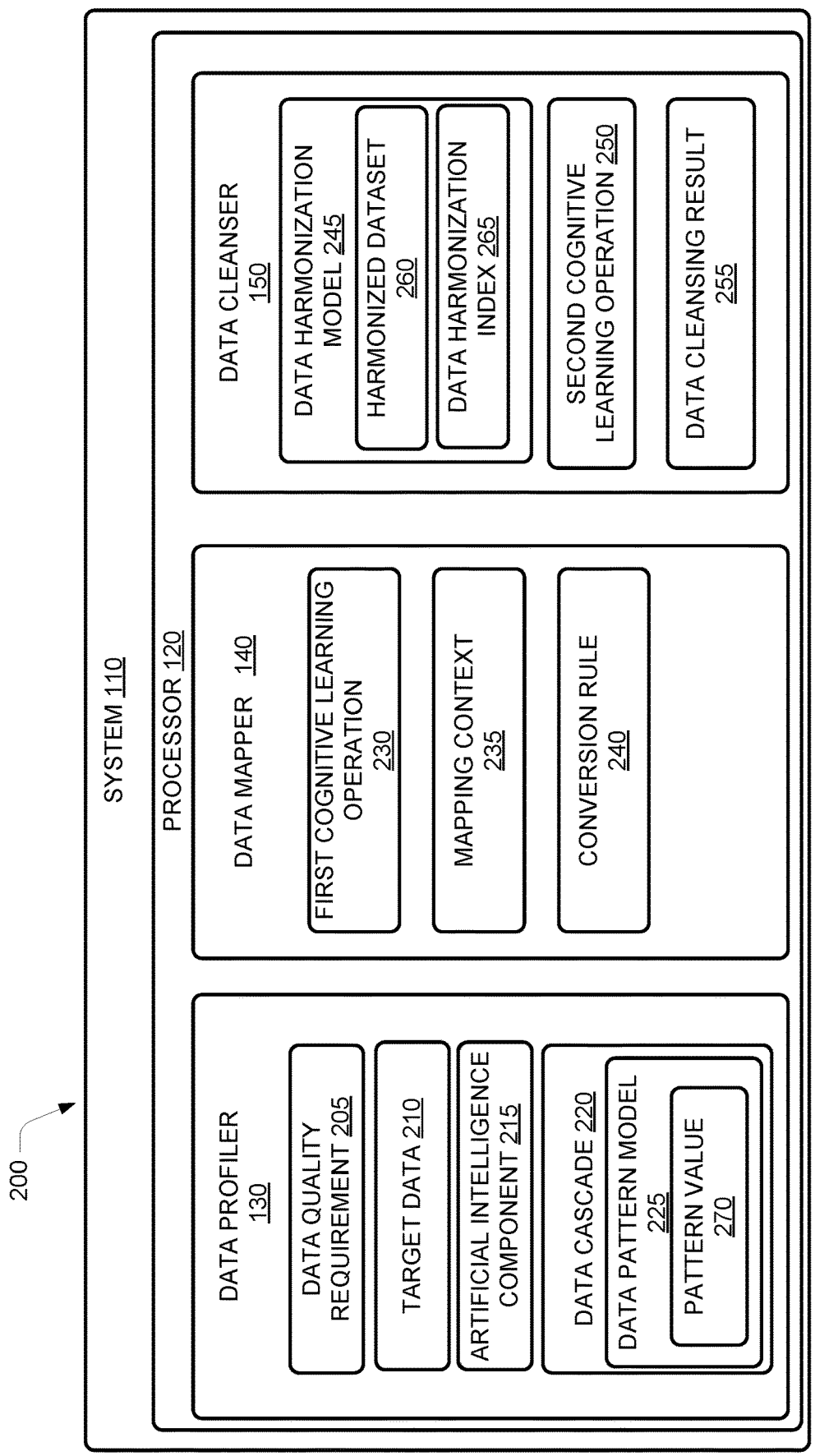
FIG. 2 illustrates various components of an intelligent data quality application, according to an example embodiment of the present disclosure.

FIG. 2 illustrates various components of the system 110 for an intelligent data quality application 110 (referred to as system 110 hereinafter), according to an example implementation of the present disclosure. In an example, the system 110 may include the processor 120. The processor 120 may be coupled to the data profiler 130, the data mapper 140 and the data cleanser 150.

In accordance with an embodiment of the present disclosure, the data profiler 130 may be configured to receive a query from a user. The query may indicate a data quality requirement 205 associated with at least one of a process, an organization, and an industry relevant for operations. In an example, the data quality requirement 205 may indicate a requirement, which may refer to a purpose of data modeling. For example, during the planning phase of a major Enterprise Resource Planning (ERP) consolidation programme, there may a need to understand a data model from the different legacy systems before determining a to-be data model. This is to say that an organization may be required to synchronize multiple data sources into a single data model and maintain the same data model for various future data modeling purposes. In an example, the legacy systems may be multiple SAP® ERP Central Component (SAP® ECC) and other non-SAP® legacy systems to be mapped to a new S/4HANA system (SAP®'s ERP for large enterprises). The system 110 may be deployed for consolidating data from various legacy systems and may be used to determine a single data model, which may be maintained for data management purposes. The system 110 may assist with data migration from various source datasets (also referred to as "Source System Data") to an organizational dataset or a target dataset. The target dataset may be the dataset generated through the application of the system 110 for intelligent data modeling. The data profiler 130 may profile the target system data for understanding the to-be data model. The data profiler 130 may profile the source system data to identify data quality issues prior to migrating to target. In an example, the system 110 may be used various BAU (business as usual) operations. For example, production data for an organization may have data quality issues, but what issues may be and how inferior the data quality may remain unknown. In such cases, the data cleansing may be time-consuming and may be very manual. The system 110 may assist with data cleansing and profiling for a low-quality data set for efficient data management. The embodiments for the data quality requirements 205 presented herein are exemplary in nature and should be treated as such. For the sake of brevity and technical clarity, the description of the intelligent data quality application may be restricted to few exemplary embodiments, however, to a person skilled in the art it should be clear that the system 110 may be used for the fulfillment of various data quality requirements 205 other than those mentioned hereinafter.

The data profiler 130 may be configured to receive a query from a user. The query may indicate a data quality requirement 205 associated with at least one of a process, an organization, and an industry relevant for operations. The data profiler 130 may obtain target data 210 (also referred to as 'target dataset 210') from a plurality of data sources associated with the data quality requirement 205. In an example, the target data 210 may further comprise researching various factors like features of a product or service, benefits of a product or service, cost of a product or service, availability of a product or service, location of a product or service, delivery method of a product or service, information regarding updates in a product or service, innovation assessment for a product or service, risk assessment for a product or service, technology assessment for a product or service, an existing collaboration for a product or service, production data for a product, marketing data for a product, analysis of a particular services on various indices and the like. In an example, the target data 210 may be a set of historical data stored in the system 110, which may be accessed by the system 110 for processing the data quality requirement 205. In accordance with an embodiment of the present disclosure, the plurality of data sources may include various datasets across Internet, news articles, various datasets maintained by various external organizations, various internal datasets comprising historical data that may be maintained by an organization.

The data profiler 130 may implement an artificial intelligence component 215 to sort the target data 210 into a data cascade 220. The artificial intelligence component 215 may be one of a data extractor, a data classifier, a data associator, a data comparer, a relationship extractor, and a dependency parser and the like. The data cascade 220 may be a series of datasets identified from the source dataset wherein information may be stored in an sequential manner. The data cascade 220 may include a plurality of attributes identified by the artificial intelligence component 215 for the target data 210. In an example, each of the attributes from the plurality of attributes may be associated with the data quality requirement 205. Each of the attributes from the plurality of attributes may include a measurable factor, which may be forming one of a set that may define a condition for processing the data quality requirement 205. In an example, the data cascade 220 may include multiple measurable factors in the form of multiple attributes that would have an impact on the purpose of the data quality requirement 205. The data cascade 220 may be arranged by the artificial intelligence component 215 such that information about an attribute from the plurality of attributes may be linked to another attribute from the plurality of attributes in a sequential manner. In an example, various patterns, trends, and fluctuations in the source system data may be profiled by the data profiler 130 into the data cascade 220. The data cascade 220 may facilitate data assimilation from various sources into a single target data 210 through categorization of various attributes from the plurality of attributes. The attributes may be identified by the artificial intelligence component 215.

For example, the purpose of the data cleansing may be to understand a data model from the different legacy systems before determining a to-be data model for developing a particular project datasets management system. The data profiler 130 may search through the plurality of data sources and identify measurable factors, which may have an impact on the requirement of various legacy systems. For example, the data profiler 130 may identify different legacy systems like SAP® ECC, or S/4HANA system which may be in the market and may be serving the different domains and industries, through searching various datasets over the Internet. The data profiler 130 may access the historical data stored in the system 110 for identifying various categories, which may be used for classification of various legacy systems as per an organizational requirement. The data profiler 130 may identify a particular pattern or trend for an industry or for a particular data quality requirement 205. The data profiler 130 may research different datasets, which may be relevant to the industry and serve the needs of the market. Further, the data profiler 130 may identify other measurable factors (not mentioned herein), which may be relevant for the processing the data quality requirement 205 (explained further in detail with more exemplary embodiments by way of subsequent Figs.).

In an example, the plurality of attributes may be identified through application of a set of category intelligence operations on at least one domain from the data cascade 220. The category intelligence operations may include identification of all measurable factors associated with the purpose of the data quality requirement 205 (further explained by way of subsequent Figs.). In an example, the system 110 may identify a new plurality of attributes for processing each data quality requirement 205. In an example, the plurality of attributes identified for a data quality requirement 205 may include at least one attribute that has been pre-set by a user.

The data profiler 130 may implement the artificial intelligence component 215 to evaluate the data cascade 220 to identify a data pattern model 225 for each of the attributes from the plurality of attributes. As mentioned above, various trends, patterns, and fluctuations from the source system data may be stored in the data cascade 220 in form of various datasets. The artificial intelligence component 215 may evaluate each of the datasets present in the data cascade 220 pertaining to the data quality requirement 205 for identification of a pattern linking various datasets. In an example, each pattern may include a pattern value 270 arranged in the form of various row, columns, and tables. The data pattern model 225 may include a model for linking various datasets with each other in a sequential manner, wherein one dataset may lead to another when a set of specified conditions defined by the data pattern model 225 may be fulfilled. In an example, the artificial intelligence component 215 may deploy various algorithms and technical modules for identifying the data cascade 220 and determining the data pattern model 225. The data pattern model 225 may be a pattern detected by the system from the data assimilated from a plurality of data sources and collated into the data cascade 220 through combining various parameters from the identified plurality of attributes. The data pattern model 225 may include generation of rules to profile data from a dataset and to auto-generate mapping and transformation rules from the profiling. For example, a dataset may be identified, which may pertain to the data quality requirement 205 and may be required to be formulated into a datasets through the generation of various mapping and transformation rules. In an example, the dataset may be obtained from a source system data that is already stored in the system 110. The dataset may include data that may be trusted. For example, the dataset to be profiled may be pre-checked to determine that it may be accurate.

To perform the data profiling as mentioned above, the data profiler 130 may implement the artificial intelligence component 215. Additionally, the artificial intelligence component 215 may include machine learning functions to analyze text and determine patterns which may be converted into rules for mapping and transformation. The rules for mapping and transformation, may, for example, include cleansing rules for cleansing low-quality data as mentioned above. For example, the data profiler 130 may identify combinations of attributes of the dataset being analyzed for the establishment of the data pattern model 225. The data pattern model 225 may be used for generation of the rules and organizational statements for the rules. The datasets present in the data cascade 220 may include data in one or more tables, which may be constituted as part of the data cascade 220 as mentioned above. The data profiler 130 may establish the data pattern model 225 by identifying patterns of values in a row or identify patterns between rows or between tables from the data cascade 220. In an example, the system may use various algorithms and technical modules as part of the artificial intelligence component 215 for determining the data pattern model 225 (explained in detail by way of subsequent Figs.). In an example, the data pattern model 225 may be based on attributes from the data cascade 220, which may be classified by the data profiler 130 as being most important for processing the data quality requirement 205. As mentioned above, the system 110 may analyze a variety of factors critical to a process, industry, or organization and may also analyze outlier data for processing the data quality requirement 205. Accordingly, the system 110 may identify at least one attribute from the data cascade 220 as being critical for the establishment of the data pattern model 225 (explained in detail by way of subsequent Figs. along with exemplary embodiments). In an example, the system 110 may identify a new set of the data pattern model 225 for processing each data quality requirement 205. In an example, the data pattern model 225 identified for a data quality requirement 205 may include at least one domain that has been pre-set by a user.

In an example, the data profiler 130 may electronically obtain consent from the user regarding the establishment of the data pattern model 225. The data profiler 130 may modify the data pattern model 225 until the consent from the user may be obtained regarding aptness of the data pattern model 225. The system 110 may be configured to obtain user input for validating rules, which have been generated thus far. For example, a pattern identified by the data pattern model 225 may be displayed to the user along with a statement describing the pattern. Also, a percentage of records that conform to the pattern may be displayed to the user. The user may validate the pattern based on the percentage of records that conform to the rule. Also, the user feedback may be provided to the machine learning functions of the artificial intelligence component 215 to improve the accuracy of pattern identification and rule generation.

In an example, the data profiler 130 may update the target data 210 simultaneously as it is acquired by the plurality of data sources, thereby making the system 110 a data cleansing model based upon real-time data. The data profiler 130 may receive target data 210 from the plurality of data sources. The data presented by the plurality of data sources may be updated continuously, and such an update may be critical for processing a data quality requirement 205 in some cases. The data profiler 130 may be configured to acquire any update in target data 210 pertaining to a specific data quality requirement 205 from the plurality of data sources. Such an acquisition may facilitate the effective processing of the data quality requirement 205 (explained further by subsequent sections).

The system 110 may further include the data mapper 140 coupled to the processor 120. The data mapper 140 may implement a first cognitive learning operation 230 to determine at least one mapping context 235 associated with the data quality requirement 205 from the data cascade 220 and the data pattern model 225. The mapping context 235 to include the pattern value 270 from the data pattern model 225 and at least one attribute from the data cascade 220. As mentioned above the data cascade 220 may include the plurality of attributes arranged in a sequential manner and the data pattern model 225 may include patterns of values in a row, or identify patterns between rows or between tables from the data cascade 220. The data mapper 140 may identify an attribute from the plurality of attributes and map the same against relevant pattern value 270$s$ from the data pattern model 225. For example, if one of the attributes from the plurality of attributes associated with the data quality requirement 205 may be a product category, wherein various products manufactured or purchased by an organization may have been profiled by the data profiler 130. The data cascade 220 may further include various related attributes like a list of product names for each of the product categories, prices for each of the products for each of the product categories, and the like. The relevant data pattern model 225 would include various patterns of values in a row, column or a table related to data regarding various products categories and also data regarding various attributes related to the product category attribute. The data mapper 140 may select a single attribute, for example, the product category from the data cascade 220, and assimilate related pattern value 270$s$ from the related data pattern model 225 for generating the mapping context 235 for product category mapping.

The data mapper 140 may determine a conversion rule 240 from the data pattern model 225 for each of the mapping context 235 associated with the data quality requirement 205. For example, the mapping may be identified as the product category mapping. The data mapper 140 may identify at one conversion rule 240 for mapping data from various source system datasets for converting data assimilated from there based on, for example, the mapping context 235 of product categories. In an example, the data mapper 140 may determine a different conversion rule 240 from the data pattern model 225 for each mapping context 235 identified by the data mapper 140 from the data cascade 220.

The data mapper 140 may obtain consent from the user regarding the establishment of the conversion rule 240. The data mapper 140 may modify the conversion rule 240 until the consent from the user may be obtained regarding aptness of the conversion rule 240. The data mapper 140 may modify the conversion rule 240 until the consent from the user may be obtained regarding aptness of the conversion rule 240$s$ generated thus far. The system 110 may be configured to obtain user input for validating rules, which have been generated thus far. For example, a conversion rule 240 identified by the data mapper 140 may be displayed to the user along with a statement describing the conversion rule 240. Also, a percentage of records that conform to the conversion rule 240 may be displayed to the user. The user may validate the conversion rule 240 based on the percentage of records that conform to the rule. Also, the user feedback may be provided to the machine learning functions of the first cognitive learning operation 230 component to improve the accuracy of rule generation.

In an example, the first cognitive learning operation 230 may include various algorithms and technical modules (explained in detail by way of subsequent Figs.), which may be used for determination of the mapping context 235 and the conversion rule 240.

As mentioned above, the system 110 may further include the data cleanser 150. The data cleanser 150 may obtain data pattern model 225 for each attribute associated with the data quality requirement 205. In an example, the data cleanser 150 may obtain the data pattern model 225 from the data profiler 130. The data cleanser 150 may obtain the conversion rule 240 determined for each of the mapping context 235 associated with the data quality requirement 205. In an example, the data cleanser 150 may obtain the conversion rule 240 from the data mapper 140. The data cleanser 150 may establish a data harmonization model 245 corresponding to the data quality requirement 205 by performing a second cognitive learning operation 250 on the obtained data pattern model 225 domain and the obtained conversion rule 240. The data harmonization model 245 may include a set of rules and conditions which may be deployed by the system for data sensitization and synchronization after data mapping and data profiling has been completed by the system 110. For example, the datasets obtained through the data pattern model 225 and the conversion rule 240s may include some outliers and some data may not conform to a synchronized style of documentation. The data cleanser 150 may deploy the second cognitive learning operation 250 to clean the data and generate the target data 210 base in response to the data quality requirement 205. In an example, the data harmonization model 245 may further include a harmonized dataset 260 comprising at least a part of the target data 210 from the plurality of sources collated through the implementation of the artificial intelligence component 215, the first cognitive learning operation 230, and the second cognitive learning operation 250. The harmonized dataset 260 may have been generated from various source system datasets and synchronized into a single dataset by application of the artificial intelligence component 215, the first cognitive learning operation 230, and the second cognitive learning operation 250. In an example, the harmonized dataset 260 may form a part of the final target datasets generated by the system 110 from the source system data by the application of the data pattern model, the conversion rules, and the data harmonization model.

The data cleanser 150 may obtain consent from the user regarding the establishment of the data harmonization model 245. The system may modify data harmonization model 245 until the consent from the user may be obtained regarding aptness of the data harmonization model 245. The data cleanser 150 may modify the data harmonization model 245 until the consent from the user may be obtained regarding aptness of the data harmonization model 245 generated thus far. The system 110 may be configured to obtain user input for validating rules, which have been generated thus far. For example, a data harmonization model 245 identified by the data cleanser 150 may be displayed to the user along with a statement describing the data harmonization model 245. Also, a percentage of records that conform to the data harmonization model 245 may be displayed to the user. The user may validate the data harmonization model 245 based on the percentage of records that conform to the data harmonization model 245. Also, the user feedback may be provided to the machine learning functions of the second cognitive learning operation 250 component to improve the accuracy of rule generation.

The data harmonization model 245 may further include a data harmonization index 265 indicative of a level of harmonization achieved in the at least a part of the target data 210 through the implementation of the artificial intelligence component 215, the first cognitive learning operation 230, and the second cognitive learning operation 250. For example, the data harmonization index 265 may indicate the quality of data harmonization achieved by the application of various machine learning tools and techniques on the source system data. As mentioned above, the system 110 may be used to process low-quality data into high-quality data. The data harmonization index 265 may quantitatively measure the quality of target data 210 achieved through selection of, a particular data pattern model 225, a particular conversion rule 240, and a particular data harmonization model 245 by the artificial intelligence component 215, the first cognitive learning operation 230, and the second cognitive learning operation 250 respectively. The user of the system 110 may modify any of the data pattern model 225, the conversion rule 240s, and the data harmonization model 245 based on the data harmonization index 265. For example, a low value of the data harmonization index 265 may indicate low-quality data processing and a requirement for change in at least of one of the data pattern model 225, the conversion rule 240s, and the data harmonization model 245.

The data cleanser 150 may generate a data cleansing result 255 corresponding to the data quality requirement 205, the data cleansing result 255 comprising the data harmonization model 245 relevant for a resolution to the query. In an example, the data cleansing result 255 may be generated as an electronic document in response to the query of the user. In an example, the data cleanser 150 may provide evidence supporting the data harmonization model 245. In an example, the second cognitive learning operation 250 may include various algorithms and technical modules, which may be used for intelligent data cleansing operations and establishment of the data harmonization model 245 (explained by way of subsequent Figs.). In an example, the data harmonization model 245 may be established by performing intelligent data cleansing operations on the data pattern model 225 based on the mapping context 235 and the conversion rule 240s generated for a particular dataset.

In an example, data profiler 130 may establish a profiling library, by associating the data pattern model 225 and the identified plurality of attributes with the data quality requirement 205. For example, the system 110 may identify a plurality of attributes for a particular data quality requirement 205. Additionally, the system would also identify a set of data pattern model 225 for that particular data quality requirement 205. The data profiler 130 may be configured to associate the identified plurality of attributes and the identified data pattern model 225 for that specific data quality requirement 205. The system 110 may store the identified plurality of attributes with the associated data pattern model 225 in the profiling library. The system 110 may access the profiling library for using the identified plurality of attributes with the associated data pattern model 225 for processing a similar data quality requirement 205 in future (further explained by way of FIG. 2 and FIG. 3).

In operation, the system 110 may receive the data quality requirement 205 from a user of the system 110. The system 110 may identify the plurality of data sources related to the processing of the data quality requirement 205. The system 110 may obtain the target data 210 from the plurality of data sources for processing the data quality requirement 205. The system may implement the artificial intelligence component 215 for profiling the target data 210 into the data cascade 220. The data cascade 220 may include various attributes from the target data 210 identified and arranged in a sequential manner. The artificial intelligence component 215 may evaluate the data cascade 220 for identification of the data pattern model 225. As mentioned above, the data pattern model 225 may include various pattern values like the pattern value 270 wherein the target data 210 may be arranged in the form of rows, columns, and tables. In an example, the data pattern model 225 may include the patterns identified such that multiple attributes from more the data cascade 220 may be linked together to form the patterns of rows, columns, and tables. The system 110 may present a sample of the target data 210 profiled as per the data pattern model 225 to the user of the system 110. The user may modify the data pattern model and there might a subsequent modification in the data cascade 220. The user may modify the arrangement of various rows, and tables present in the data pattern model and the system 110 may make subsequent modifications in the rest of the target data 210. In an example, the modification in the data pattern model 225 may lead to a modification in the data cascade 220. The system 110 may make such modification and notify the user of the system 110 regarding the same. The system 110 may modify techniques implemented by the artificial intelligence component 215 based on feedback from the user regarding the data pattern model 225.

The data mapper 140 may obtain the data pattern model 225 and data cascade 220. The data mapper may implement the first cognitive learning operation 230 for identification of the mapping context 235. The mapping context 235 may include the pattern value 270 from the data pattern model 225 mapped against at least one attribute from the data cascade 220. The data mapper 140 may implement the first cognitive learning operation 230 to determine the conversion rule 240 from the mapping context 235. The conversion rule 240 may include a set of rules or conditions, which may be deployed by the system 110 for conversion and mapping of the profiled target data 210 into the target datasets (as mentioned above). The system 110 may present the user of the system a sample of the mapped target data 210 based on the conversion rule 240. The user may modify the conversion rule and there might a subsequent modification in the mapping context 235. The system 110 may modify techniques implemented by the first cognitive learning operation 230 based on feedback from the user regarding the conversion rule 240.

Further, after the target data 210 has been profiled from various source system datasets and mapped as per user requirements, the data cleanser 150 may implement the second cognitive learning operation 250 for the generation of the data harmonization model 245. The data harmonization model 245 may include a set of rules which may be applied to the target 210 identified for processing the data quality requirement 205. In an example, the data harmonization model 245 may include the harmonized dataset 260 which may be a part of the target data 210 generated after application of the artificial intelligence component 215, the first cognitive learning operation 230, and the second cognitive learning operation 250. In an example, the system 110 may be configured so that a change in the harmonized dataset 260 may lead to subsequent changes on the data pattern model 225, the data harmonization model 245, and the conversion rule 240. In an example, the user of the system may modify any one of the data pattern model 225, the data harmonization model 245, and the conversion rule 240 for generating a change in the harmonized dataset 260. The artificial intelligence component 215, the first cognitive learning operation 230, and the second cognitive learning operation 250 may be modified by the system 110 on receiving feedback from a user regarding the harmonized dataset 260.

Figure 3:
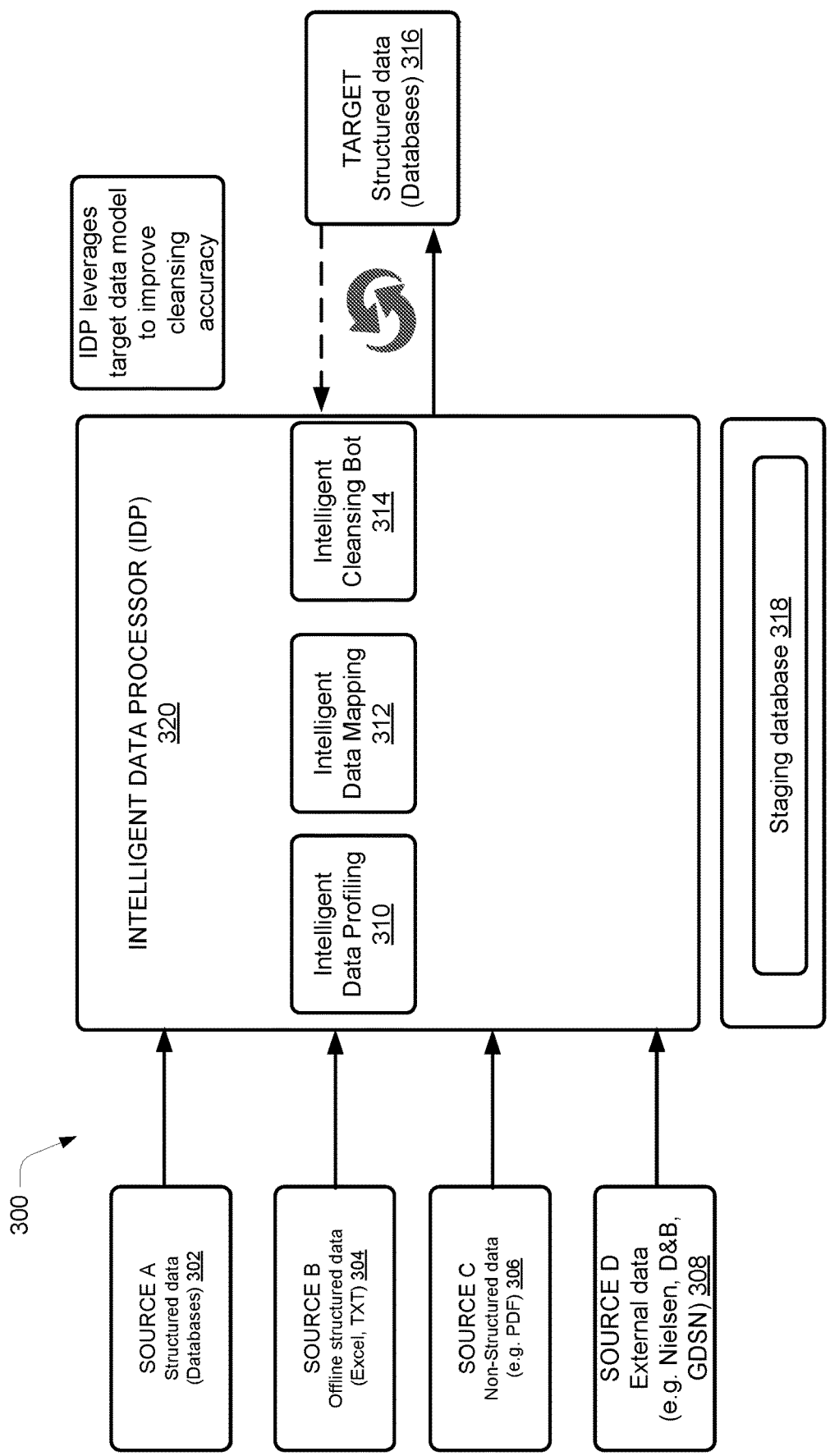
FIG. 3 illustrates components of the intelligent data quality application, according to an example embodiment of the present disclosure.

FIG. 3 illustrates key areas of an intelligent data quality application 300, according to an example embodiment of the present disclosure. The system 300 may be similar to the system 110 and all components described above for system 110 may be used by the system 300 as well.

In accordance with an embodiment of the present disclosure, the system 300 may include an intelligent data processor 320. The intelligent data processor 320 may include an intelligent data profiling component 310, an intelligent data mapping component 312, and an intelligent cleansing bot 314. The intelligent data profiling component 310, the intelligent data mapping component 312, and the intelligent cleansing bot 314 may be coupled to a staging dataset 318. In an example, the staging dataset 318 may be SAP® HANA. The SAP® HANA may refer to an in-memory, column-oriented, relational dataset management system developed and marketed by SAP®SE. Its primary function as a dataset server may be to store and retrieve data as requested by various applications, for example, the intelligent data profiling component 310, the intelligent data mapping component 312, and the intelligent cleansing bot 314.

In accordance with an embodiment of the present disclosure, the intelligent data profiling component 310 may obtain data from various structured and non-structured datasets. In an example, the data obtained from various structured and non-structured datasets may be the target data 210. Further, various structured and non-structured datasets may include, for example, a source A dataset 302, a source B dataset 304, a source C dataset 306, and a source D dataset 308. In an example, the source A dataset 302 may include various external dataset accessible over the Internet, as mentioned above. The source B dataset 304 may include various offline structured dataset like MS Excel® and the like. The source C dataset 306 may include various non-structured data sources wherein the information may be stored in various portable formats like PDF® (Portable File Format). The source D dataset 308 may include external data sources or sources maintained outside the purview of an organization by external agencies like Nielsen, D&B, GDSN, and the like.

The intelligent data processor 320 may obtain target data 210 from at least one of the source A dataset 302, the source B dataset 304, the source C dataset 306, and the source D dataset 308. The intelligent data profiling component 310 of the intelligent data processor 320 may implement the artificial intelligence component 215 on the target data obtained from the source A dataset 302, the source B dataset 304, the source C dataset 306, and the source D dataset 308. The intelligent data profiling component 310 may identify the data pattern model 225 from the data obtained from the source A dataset 302, the source B dataset 304, the source C dataset 306, and the source D dataset 308. The intelligent data mapping component 312 of the intelligent data processor 320 may implement the first cognitive learning operation on the data obtained from the source A dataset 302, the source B dataset 304, the source C dataset 306, and the source D dataset 308 and on the data pattern model 225 generated therein for determination of the mapping context 235 and subsequent determination of the conversion rule

240. The intelligent cleansing bot 314 of the intelligent data processor 320 may implement the second cognitive operation 250 over the data obtained from the source A dataset 302, the source B dataset 304, the source C dataset 306, and the source D dataset 308, the data pattern model 225, and the conversion rule 240 determined therein. Each of the intelligent data profiling component 310, the intelligent data mapping component 312, and the intelligent cleansing bot 314 may store and retrieve data from the staging dataset 318.

The intelligent data processor 320 may generate a target structured dataset 316 from the data obtained from the source A dataset 302, the source B dataset 304, the source C dataset 306, and the source D dataset 308 through the application of the artificial intelligence component 215, the first cognitive learning operation 230, and the second cognitive learning operation 250 (explained in detail by way of subsequent Figs.). In an example, the intelligent data processor 320 may obtain feedback from the target structured dataset 316 for improving the accuracy of any of the techniques deployed by the intelligent data profiling component 310, the intelligent data mapping component 312, and the intelligent cleansing bot 314. In an example, the target structured dataset 316 may include the harmonized dataset 260

Figure 4:
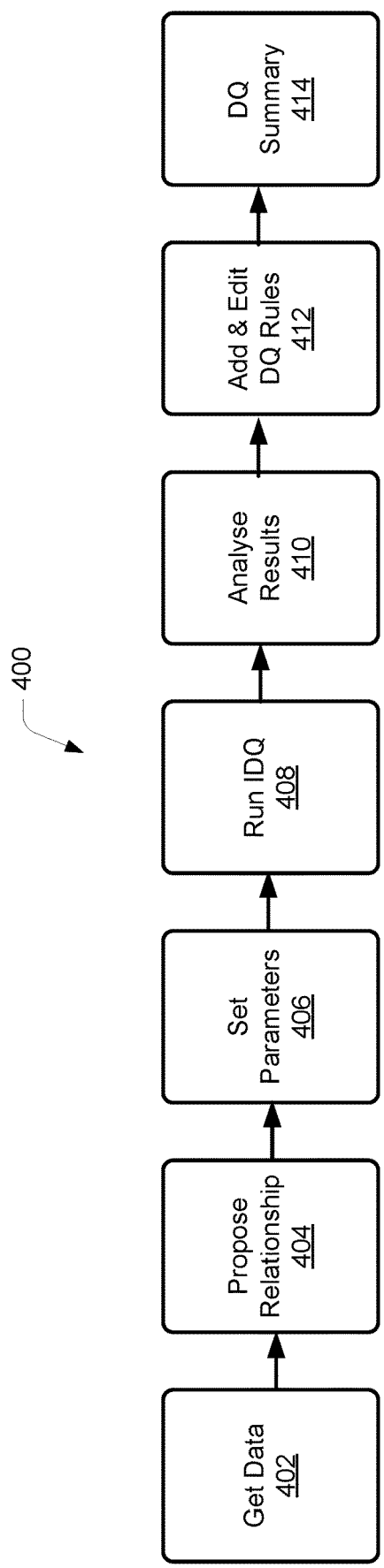
FIG. 4 illustrates a process flowchart for intelligent data profiling based on the intelligent data quality application, according to an example embodiment of the present disclosure.

FIG. 4 illustrates a process flowchart for a process 400 for intelligent data profiling based on the intelligent data quality application 110, according to an example embodiment of the present disclosure. The process 400 may deploy any of the components of the system 110. For the sake of brevity and technical clarity, any of the components of the system 110 are not explained here. In accordance with an embodiment of the present disclosure, the process 400 may include various steps carried out by the data profiler 130 for profiling data received from the plurality of data sources. In an example, the process 400 may be carried out by the intelligent data profiling component 310 on the data obtained from the source A dataset 302, the source B dataset 304, the source C dataset 306, and the source D dataset 308.

The process 400 may include the data profiler 130 to obtains target data 210 from the plurality of data sources at block 402. The data profiler 130 may implement the artificial intelligence component 215 on the data obtained at the block 402 for proposing a relationship between various moieties of the target data 210 at block 404. The data profiler may set parameters at block 406. The parameters may pertain to various attributes and may facilitate the generation of the data cascade 220 from the data obtained at the block 402. The data profiler 130 may implement the artificial intelligence component 215 at block 408 on the set parameters from the block 406. The data profiler 130 may analyze results at block 410 obtained from the implementation of the artificial intelligence component 215 at block 408. The analyzed results may form the data pattern model 225. The data profiler 130 may edit the data pattern model 225 at block 412 and generate a summary of the data pattern model 225 at block 414. In an example, the summary generated at the block 414 may be presented to the user for validation or subsequent modifications. The results generated from the process 400 may be deployed by the data mapper 140 for further processing of the data quality requirement 210. All steps presented herein by way of the process 400 would be explained in detail by way of FIGS. 5-8.

Figure 5:
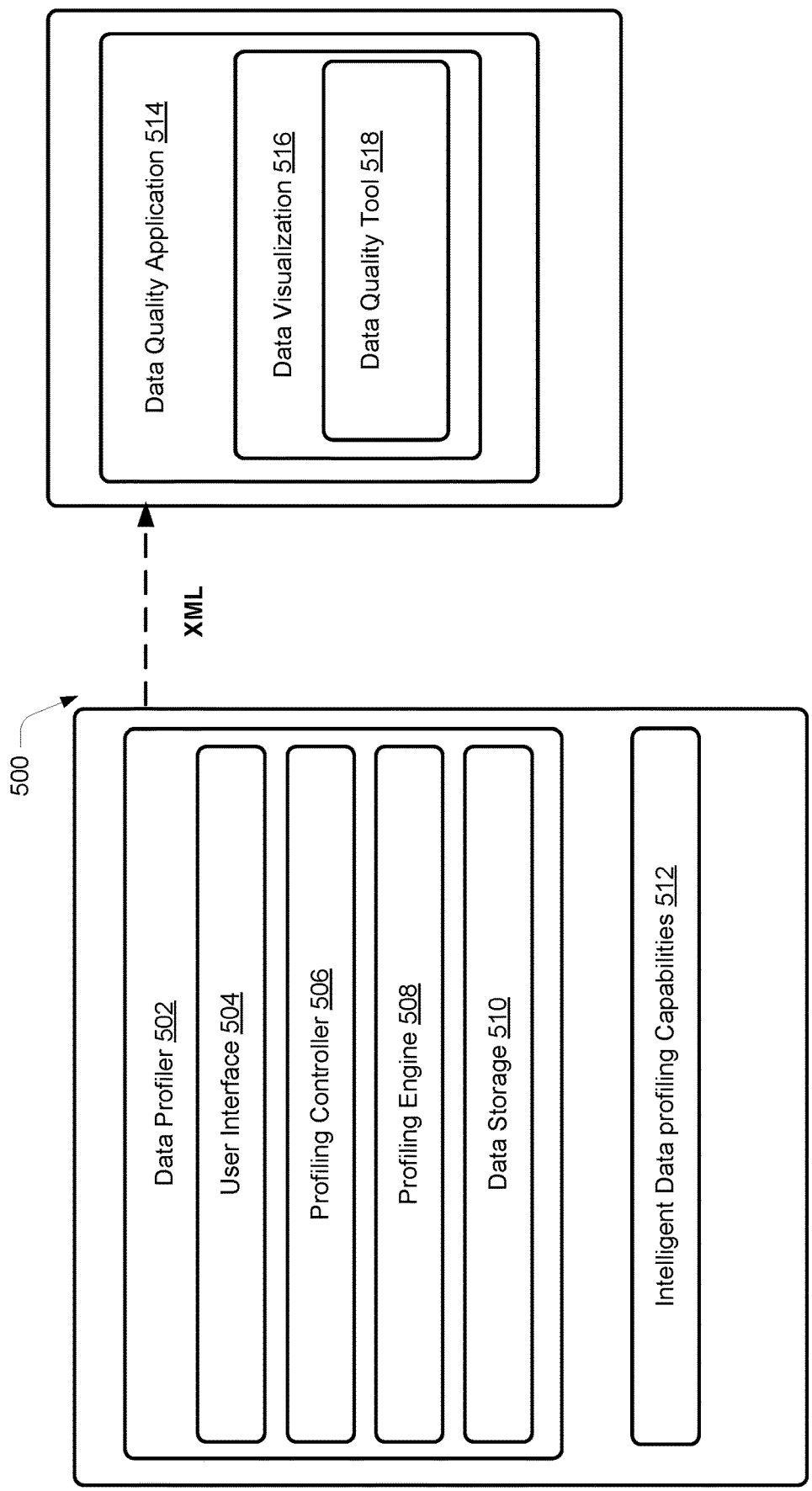
FIG. 5 illustrates a diagram of architectural details for the intelligent data profiling component of the intelligent data quality application, according to an example embodiment of the present disclosure.

FIG. 5 illustrates a diagram of architectural details for the intelligent data profiling component 310 of the intelligent data quality application 300, according to an example embodiment of the present disclosure. As mentioned above, the system 300 may be similar to the system 110. The intelligent data profiling component 310 may be similar to the data profiler 130. In accordance with an embodiment of the present disclosure, the intelligent data profiling component 310 may be illustrated as a data profiler 502. The data profiler 502 may include a user interface 504, a profiling controller 506, a profiling engine 508, and a data storage 510. In an example, the data storage 510 may be the same as the staging dataset 318. The data profiler 502 may be configured so that the functions carried out by the user interface 504, the profiling controller 506, the profiling engine 508, and the data storage 510 may implement a set of intelligent data profiling capabilities 512. In an example, the set of intelligent data profiling capabilities 512 may include the artificial intelligence component 215. In an example, the artificial intelligence component 215 may be configured to implement data ingestion, rules generation for determination of the data pattern model 225, and data profiling (as mentioned above by way of FIG. 1 and FIG. 2). In an example, the artificial intelligence component 215 may implement techniques of machine learning thereby making the data profiler 502 a self-learning and updating profiler. As mentioned above, the artificial intelligence component 215 may use various technical modules for the development of the data cascade 220 and the data pattern model 225. In an example, the set of intelligent data profiling capabilities 512 may include the technical modules, which may be deployed by the user interface 504, the profiling controller 506, and the profiling engine 508 for development of the data cascade 220 and the data pattern model 225.

The user interface 504 may be a user interface to enable clear data analysis and accelerate the decision-making process for processing the data quality requirement 210. In accordance with an embodiment of the present disclosure the user interface, 504 may deploy a subset of the intelligent data profiling capabilities from the set of the intelligent data profiling capabilities 512. The subset may include various intelligent data profiling capabilities, for example, a capability P201, a capability P202, a capability P203, a capability P204, a capability P205, a capability P206, and a capability P207. The capability P201 may relate to identifying various parameters, which may allow a user to refine the profiling execution selection, enabling user to refine the setting in order to get the most accurate profiling result. The capability P202 may relate to data viewing. The capability P202 may allow a user to view the loaded file/table data to check if files may be loaded correctly. The capability P203 may be relationship presentation to the user. The capability P203 may relate to providing the relationship between loaded files/table. The capability P203 may also provide the ability to change the identified relationship. The capability P204 may relate to a rule display for displaying patterns and rules generated by the data profiler 502. The capability P204 may show the result of the profiling execution where the user may download review or take action. The capability P205 may relate to downloading of rule data. The capability P205 may allow the user to download the failed or passed data for review. The capability P206 may relate to P206 to rule approval. The capability P206 may provide the capabilities to allow the user to approve or reject the rules. The capability P207 may relate to a rule update. The capability P207 may provide the capability to allow the user to update any auto-suggested rule and execute against current data. The capabilities of the set of the intelligent data profiling capabilities 512 provided herein may be exemplary in nature and the data profiler 502 may deploy other capabilities similar to described above for carrying out various functions of the user interface 504. In an example, the user interface 504 may be deployed for obtaining consent from the user regarding aptness of the data pattern model 225. The user interface 504 may also be used to obtain feedback from the user regarding the generation of the data cascade 220, and the data pattern model 225.

In accordance with an embodiment of the present disclosure, the profiling controller 506 may deploy a subset of intelligent data profiling capabilities from the set of the intelligent data profiling capabilities 512. The subset may include various intelligent data profiling capabilities, for example, a capability P301, a capability P302, and a capability P303. The capability P301 may relate to the determination of a rule definition table. The capability P301 may contain the configuration values for generating rule in a language usually followed by an organization. In an example, the configuration values may the pattern value 270. The capability P302 may relate to Rule Result Conversion for converting the result from the intelligent cleansing bot 314 to an organizational user format. The capability P301 may relate to a rule update for saving the updated rule in a dataset. The dataset may be the data storage 510. The capabilities of the set of the intelligent data profiling capabilities 512 provided herein may be exemplary in nature and the data profiler 502 may deploy other capabilities similar to described above for carrying out various functions of the mapping controller 506. In an example, the mapping controller 506 may be used for generation of the data pattern model 225. The profiling controller 506 may convert the output from the data cleanser 150 in an organizational standard way, which may be later presented in by the user interface 504.

In accordance with an embodiment of the present disclosure the profiling engine, 508 may deploy a subset of intelligent data profiling capabilities from the set of the intelligent data profiling capabilities 512. The subset may include various intelligent data profiling capabilities, for example, a capability P101, a capability P102, a capability P103, a capability P104, a capability P105, a capability P106, a capability P107, and a capability P108. In an example, the profiling engine 508 may adapt from an algorithm from any of the capability P101, the capability P102, the capability P103, the capability P104, the capability P105, the capability P106, the capability P107 and the capability P108 to generate the business rules per data quality dimension, thereby making the system 110 a dynamic system, which may deploy the AI tools and techniques to generate rules based on a data quality situation. The profiling engine 508 may process the structured or non-structured data using an AI algorithm. In an example, the profiling engine 508 may process the data obtained from the source A dataset 302, the source B dataset 304, the source C dataset 306, and the source D dataset 308 using any of the capabilities mentioned above.

The capability P101 may relate to a completeness dimension for processing the data using the AI algorithm and identify the rules under completeness dimension. The artificial intelligence component 215 may classify a rule or a pattern on the completeness dimension if it may involve checking whether a mandatory field is always populated with a value or if value population in a set of fields can determine if a field may be mandatory or not. The capability P101 may further include various algorithm functions like COMP1, COMP2, COMP3, COMP4, COMP5, and COMP6. The COMP1 algorithm function may identify if a field is mandatory. In an example, the COMP1 algorithm function may be a SQL native function. The COMP2 algorithm function may identify if a field is rarely used. In an example, the COMP2 algorithm function may be an Apriori (Hana PAL) algorithm. The COMP3 algorithm function may identify if a field is mandatory only when a set of other fields may be populated. In an example, the COMP3 algorithm function may be an Apriori (Hana PAL) algorithm. As mentioned above, the data profile 130 may generate the data cascade 220 for the target data 210. The COMP3 algorithm function may be deployed by the artificial intelligence component 215 in order to arrange the plurality of attributes in the data cascade in a sequential manner, wherein a particular dataset a particular attribute may only be classified based on a related attribute and accompanying dataset. The COMP4 algorithm function may identify if a field is mandatory only when a set of other fields may not be populated. In an example, the COMP4 algorithm function may be an Apriori (Hana PAL). The COMP5 algorithm function may identify if a field may be empty only when a set of other fields may be populated. In an example, the COMP5 algorithm function may be an Apriori (Hana PAL). The COMP6 algorithm function may identify if a field is empty only when a set of other fields may not be populated. In an example, the COMP1 algorithm function may be an Apriori (Hana PAL).

The capability P102 may relate to uniqueness to process the data using the AI algorithm and identify the rules under uniqueness dimension. The artificial intelligence component 215 may classify a rule or a pattern on the uniqueness dimension if it may involve checking whether an attribute value or combination of attribute values is a unique entry in the data and is not duplicated. The capability P102 may further include various algorithm functions like UNIQ1 and UNIQ2. The UNIQ1 algorithm function may identify if a field is unique. In an example, the UNIQ1 algorithm function may be a SQL native function. The UNIQ2 algorithm function may identify if a combination of fields is unique. In an example, the UNIQ2 algorithm function may be an R Logical Code. The capability P102 may be responsible for removing any duplicate values from data profiled by the data profiler 130, or the data profile 502.

The capability P103 may relate to integrity to process the data using the AI algorithm and identify the rules under integrity dimension. The artificial intelligence component 215 may classify a rule or a pattern on the integrity dimension if it may involve crosschecking an attribute value against an existing reference table. The capability P103 may further include various algorithm functions like INT1. The INT1 algorithm function may identify if a field has values that are a subset of values from a list. In an example, the INT1 algorithm function may be a SQL native function.

The capability P104 may relate to conformity to process the data using the AI algorithm and identify the rules under completeness dimension. The conformity processing under the completeness dimension may be done for conforming a format check, a length check, a range check, and a conformity type check. The artificial intelligence component 215 may classify a rule or a pattern on the conformity format check if it may involve checking that an attribute value conforms to a specific format type. The specific format type may include attribute values with a distinct combination of numbers and letters, capitalization formats, special character inclusions, exclusions, and the like. The conformity format check may include algorithm functions like CONF1, CONF2, and CONF3. The CONF1 algorithm function may identify common patterns for values within a field. In an example, the CONF1 algorithm function may be an R Logical Code. For example, the conformity format check may ascertain that only positive integer numbers are allowed as pattern value 270. In an example, the conformity format check may ascertain that only positive integer numbers are allowed of pattern 91{NNNNNNN}, wherein N may stand for a number between 0 and 9. The conformity format check may ascertain that only capital Characters A-Z may be allowed. The conformity format check may ascertain that only alphabet and numbers are allowed of pattern VAT {NNNNN}, wherein N may stand for a number between 0 and 9. The conformity format check may ascertain that only numbers and character + and − is allowed with pattern +{NN}-{NNNNNNN}, wherein N may stand for a number between 0 and 9. The CONF 2 algorithm function may identify patterns in the field that occur only when a set of fields have certain values. In an example, the CONF2 algorithm function may be an R Logical Code. The CONF 3 algorithm function may identify if a field may have values, which may be fully or partially derived from values in another field (s) within the table. In an example, the CONF2 algorithm function may be an R Logical Code.

The artificial intelligence component 215 may classify a rule or a pattern on the conformity length check if it involves checking that an attribute value conforms to a specific character length. The length check may include algorithm functions like CONF4. The CONF 4 algorithm function may identify the range of character length of values within the field. In an example, the CONF4 algorithm function may be a SQL Native Function. The artificial intelligence component 215 may classify a rule or a pattern on the conformity range check if it involves checking that an attribute value conforms to a specific range of numeric values. The range check may include algorithm functions like CONF5. The CONF 5 algorithm function may identify the range of values within the field. In an example, the CONF4 algorithm function may be R Logical Code. The artificial intelligence component 215 may classify a rule or a pattern on the conformity type check if it involves checking that an attribute value conforms to a specific data type. The specific data type may include a numeric value, a character value, a date, and the like. The type check may include algorithm functions like CONF6. The CONF 6 algorithm function may identify the data type of the values within the field. In an example, the CONF6 algorithm function may be R Logical Code.

The capability P105 may relate to accuracy to process the data using the AI algorithm and identify the rules under accuracy dimension. The artificial intelligence component 215 may classify a rule or a pattern on the accuracy dimension if it may involve checking whether an exact attribute value(s) may always be used or never used. The exact attribute values may be default values defined by an organization. The capability P105 may further include various algorithm functions like ACCU1. The ACCU1 algorithm function may identify the allowed value for the field. In an example, the ACCU1 algorithm function may be a SQL native function.

The capability P106 may relate to consistency to process the data using the AI algorithm and identify the rules under consistency dimension. The artificial intelligence component 215 may classify a rule or a pattern on the consistency dimension if it may involve checking that an attribute value may be correct when it may be conditional or dependant on other organizational data attribute values. The capability P106 may further include various algorithm functions like CONS1, and CONS2. The CONS1 algorithm function may identify if a field may be mandatory only when a set of values may be populated in one or more fields. In an example, the CONS1 algorithm function may be an Apriori (Hana PAL). The CONS2 algorithm function may identify if a field is only allowed to have a set of values when a set of other fields have certain values. In an example, the CONS2 algorithm function may be an Apriori (Hana PAL). The capability P107 may relate to relevancy to process the data using the AI algorithm and identify the rules under the relevancy dimension. The artificial intelligence component 215 may classify a rule or a pattern on the relevancy dimension if it may involve checking transactional data to identify how often a full record or specific attribute values may active, inactive, in use and the like. The capability P108 may relate to a multilevel structure processing to process for all the above dimensions for multiple tables and structures using an AI algorithm. As mentioned above, in an example, the data pattern model 225 may include multiple attributes obtained from data cascade 220 and formulated into the single data pattern model 225.

The data profiler 502 may be configured present data processed after application of the set of AI tools and techniques described above to a data quality application 514. The data quality application 514 may include a module 516 for data visualization and a tool 518 for checking data quality. In an example, the data quality application 514 may facilitate the system 110 in access the data quality and presenting the processed data to the user of the system 110.

Figure 6:
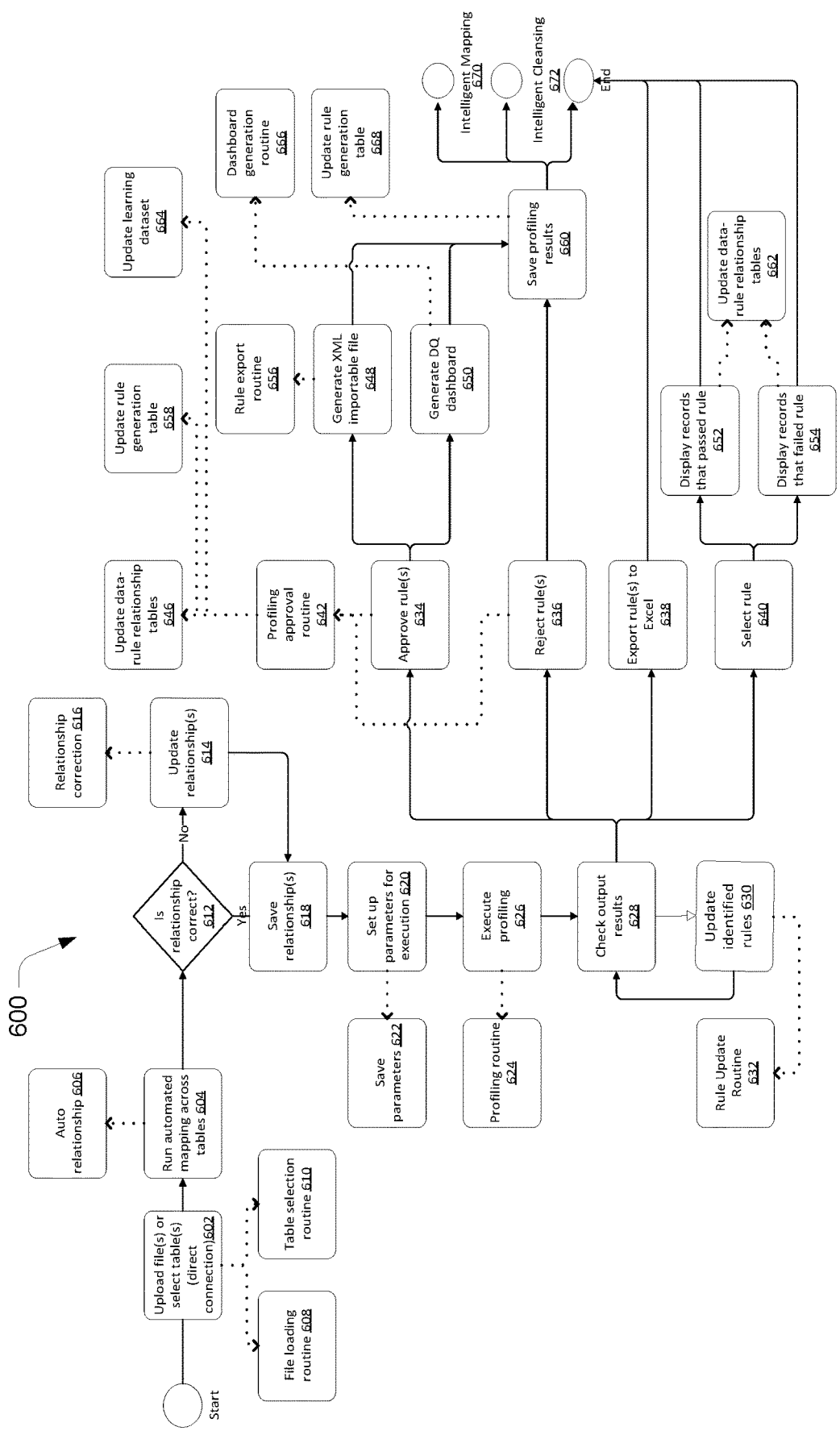
FIG. 6 illustrates a process flowchart for intelligent data profiling, according to an example embodiment of the present disclosure.

FIG. 6 illustrates a process flowchart for a process 600 for the intelligent data profiling, according to an example embodiment of the present disclosure. The process 600 may be carried out by the data profiler 130, the data profiling component 310 or the data profiler 502. The process 600 may pertain to the generation of the data pattern model 225. The process 600 may include an uploading file component 602. The uploading file component 602 may receive the data quality requirement 210. The uploading file component 602 may be implemented through a file loading routine 608, and a table loading routine 610. In an example, the file loading routine 608, and the table loading routine 610 may be implemented by the capability P201 described above. The uploading file component 602 may lead an automated mapping 604. The automated mapping 604 may include the data profiler 130 to run automated mapping across tables from the uploading file component 602. The automated mapping 604 may be coupled to a relationship component 606. The relationship component 606 may include deducing various relationships amongst source data for the purpose of generation of the data cascade 220. The process 600 may further include an inspection 612 implemented by the artificial intelligence component 215. The inspection 612 may relate to examining the correctness of the relationship identified by the relationship component 606 and the automated mapping 604. If the inspection 612 may find the relationship identified by the relationship component 606 and the automated mapping 604 to be incorrect, the process 600 implements a relationship update 614. The relationship update 614 may lead to a relationship correction 616. In an example, the correction 616 may be implemented by the capability P203, and P302 described above. The relationship correction 616 may lead to a modification in the relationship component 606 and the automated mapping 604. If the inspection 612 may find the relationship identified by the relationship component 606 and the automated mapping 604 to be correct, the process 600 implements a relationship storage 618. The relationship storage 618 may be followed by a parameter identification 620. The parameter identification 620 may include setting up various parameters which may be executed for generating data pattern model 225 from the data cascade 220. The process 600 may perform a storing operation 622 on the parameters identified from the parameter identification 620. In an example, the storing operation 622 may be implemented by the capability P201 described above. The process 600 may implement an execution 626 after the parameter identification 620. The execution 626 may relate to executing the profiling based on parameters identified from the parameter identification 620. The execution 626 may be implemented through a profiling routine 624. In an example, the profiling routine 624 may be implemented by the deploying the at least one of the capability P101, P102, P103, P104, P105, P106, P107, and P108 described above. The process 600 performs a check 628 pertaining to results from the execution 626. The check 628 may be followed by an update 630 pertaining to an update in any identified rules for execution 628 if the check 628 presents an output that does not conform to the user requirements. The update 630 may be in implemented with the rule update routine 632. In an example, the rule update routine may be implemented by the capability P202 and P303 described above.

The check 628 may lead process 600 to execute an approval 634, execute a rejection 636, execute an export 638, and execute a selection 640. The approval 634 may lead to a dashboard generation 650, and an importable file generation 648. The dashboard generation 650 may be carried out through a dashboard generation routine 666, which may be implemented by, for example, the capability P204, P301, and P302. The importable file generation 648 may be implemented through a rule export routine 656. In an example, the rule export routine 656 may be implemented through the application of the capability P205 and P302. The dashboard generation 650, and the importable file generation 648 may lead to the execution of a storage operation 660. The storage operation 660 may store profiling results generated by the profiling 626 and presenting the same to the data mapper 140 for executing a mapping 670. In an example, the storage operation 660 may store profiling results generated by the profiling 626 and presenting the same to the data cleanser 150 for a cleansing process 672, The mapping 670 and the cleansing 672 may be explained in detail by way of subsequent Figs.

The rejection 636 of the rules used for result generation by the profiling 626 may lead to the process executing the storage operation 660 for performing an update operation 668. The update operation 668 may pertain to updating the rule generation table regarding the rejection 636. The update operation 668 may be implemented through the capability P302 described above. The rejection 636 may further lead to the process 600 implementing a profiling approval routine 642. The profiling approval routine 642 may be implemented through the capability P101, P102, and P302 described above. The profiling approval routine 642 may lead to an update 646. The update 646 may pertain to updating relationship tables present in the relationship component 606 and used for the automated mapping 604. The update 646 may be implemented through the capability P203, and P302 described above. In an example, any of the profiling approval routine 642 and the update 646 may lead to an update 658 pertaining to updating the rule generation tables. The update 658 may be implemented through the capability P 301, and P302 described above. The profiling approval routine 642 and the update 658 may lead to an update 664 pertaining to updating dataset from where rules, relationships, tables may have been generated. The update 664 may be implemented through the capability P201, P301, and P302 described above. It has been mentioned above the data cascade 220, the plurality of attributes and the data pattern model 225 may be modified based on user feedback or data quality.

The export 638 may lead to the process 600 to culminate by presenting the user with a set of rules. The selection 640 may lead to the process 600 execute a first display 652, and a second display 654. The first display 652 may relate to displaying records, which may have passed the rules generated by the profiling 626. The second display 654 may relate to displaying records, which may have failed the rules generated by the profiling 626. The process may perform an update 662 pertaining to updating relationship tables present in the relationship component 606 and used for the automated mapping 604 based on the selection 640. The update 662 may be implemented through the capability P203, and P302 described above.

Figure 7:
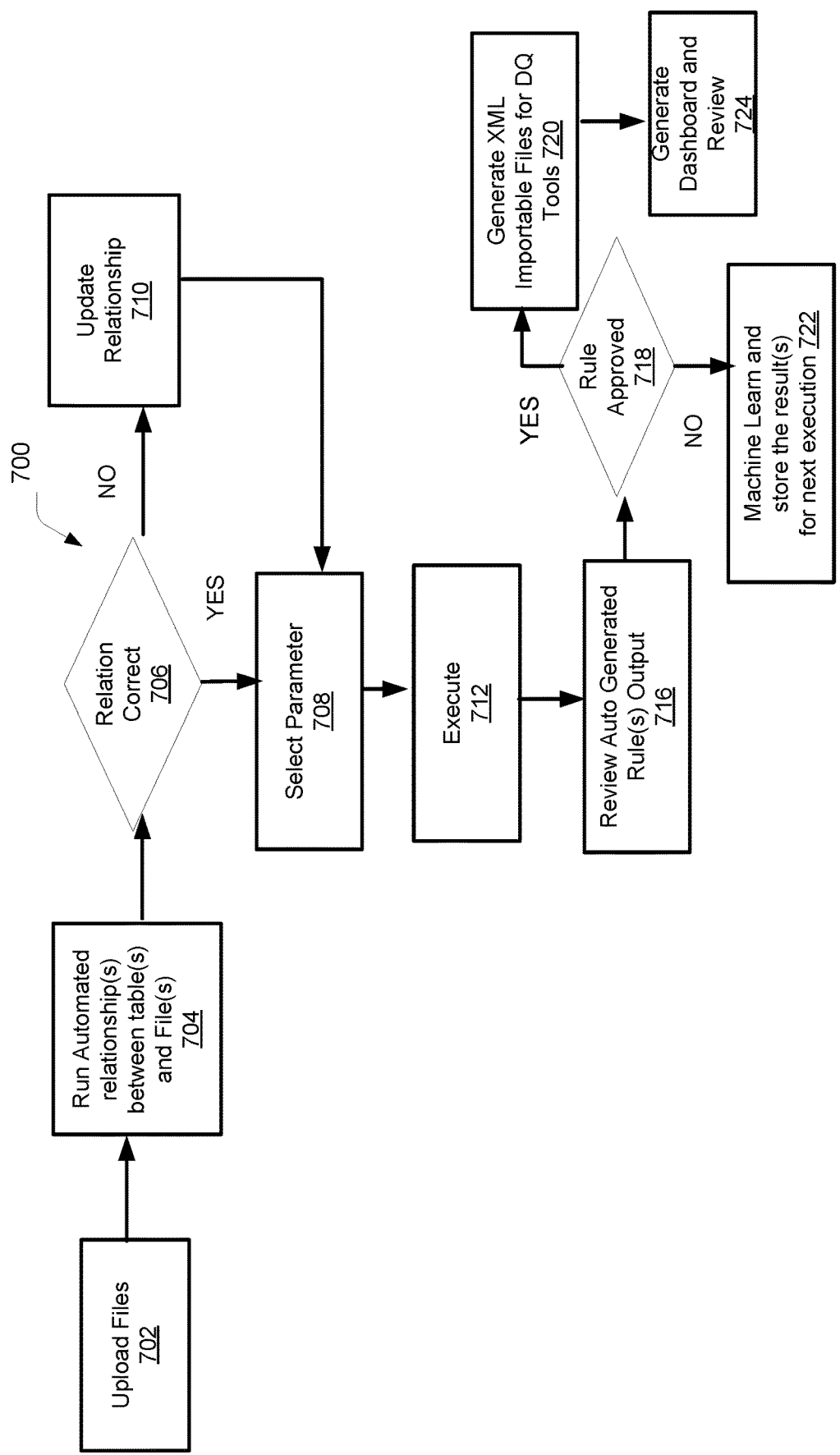
FIG. 7 illustrates a process flowchart for intelligent data profiling, according to an example embodiment of the present disclosure.

FIG. 7 illustrates a process flowchart for a process 700 for the intelligent data profiling, according to an example embodiment of the present disclosure. The process 700 may be carried out by the data profiler 130, the data profiling component 310 or the data profiler 502. The process 700 may pertain to the generation of the data pattern model 225. The process 700 may include an uploading file component 702. The uploading file component 702 may be similar to the uploading file component 602. The uploading file component 602 may lead an automated mapping 704. The automated mapping 704 may execute relationship mapping between various rows, tables, columns of the data uploaded through the uploading file component 702. The automated mapping 704 may be the same as the automated mapping 604. The process 700 may further include an inspection 706 implemented by the artificial intelligence component 215. The inspection 706 may relate to examining the correctness of the relationship identified by the automated mapping 704. If the inspection 706 may find the relationship identified by the automated mapping 604 to be incorrect, the process 700 implements a relationship update 710. The relationship update 710 may be similar to the update 614. If the inspection 706 may find the relationship identified by the automated mapping 704 to be correct, the process 700 may implement a parameter selection 708. The process 700 may implement the parameter selection 708 after performing the relationship update 710 as well. The parameter selection 708 may include selecting attributes from the plurality of attributes. The parameter selection 708 may lead to an execution 712. The execution 712 may involve executing any rules generated thus far. The execution may lead to a review 716. The review 716 may involve reviewing rules and output generated from the rules generated by the parameter selection 708. The review 716 may lead to an inspection 718. The inspection 718 may pertain to approval or rejection of the rules generated by the parameter selection 708. If the inspection 718 may approve the rules generated by the parameter selection 708, the process 700 may implement a generation 720. The generation 720 may pertain to generating importable files for the data quality tools 518. The generation 720 along with the data quality tools 518 lead to a dashboard generation 720. The dashboard generation 720 may be the same as the dashboard generation 650 and may be implemented through the dashboard generation routine 666. If the inspection 718 may reject the rules generated by the parameter selection 708, the process 700 may implement a n execution 722. The execution 722 may involve machine learning and storing the result for the next execution.

Figure 8:
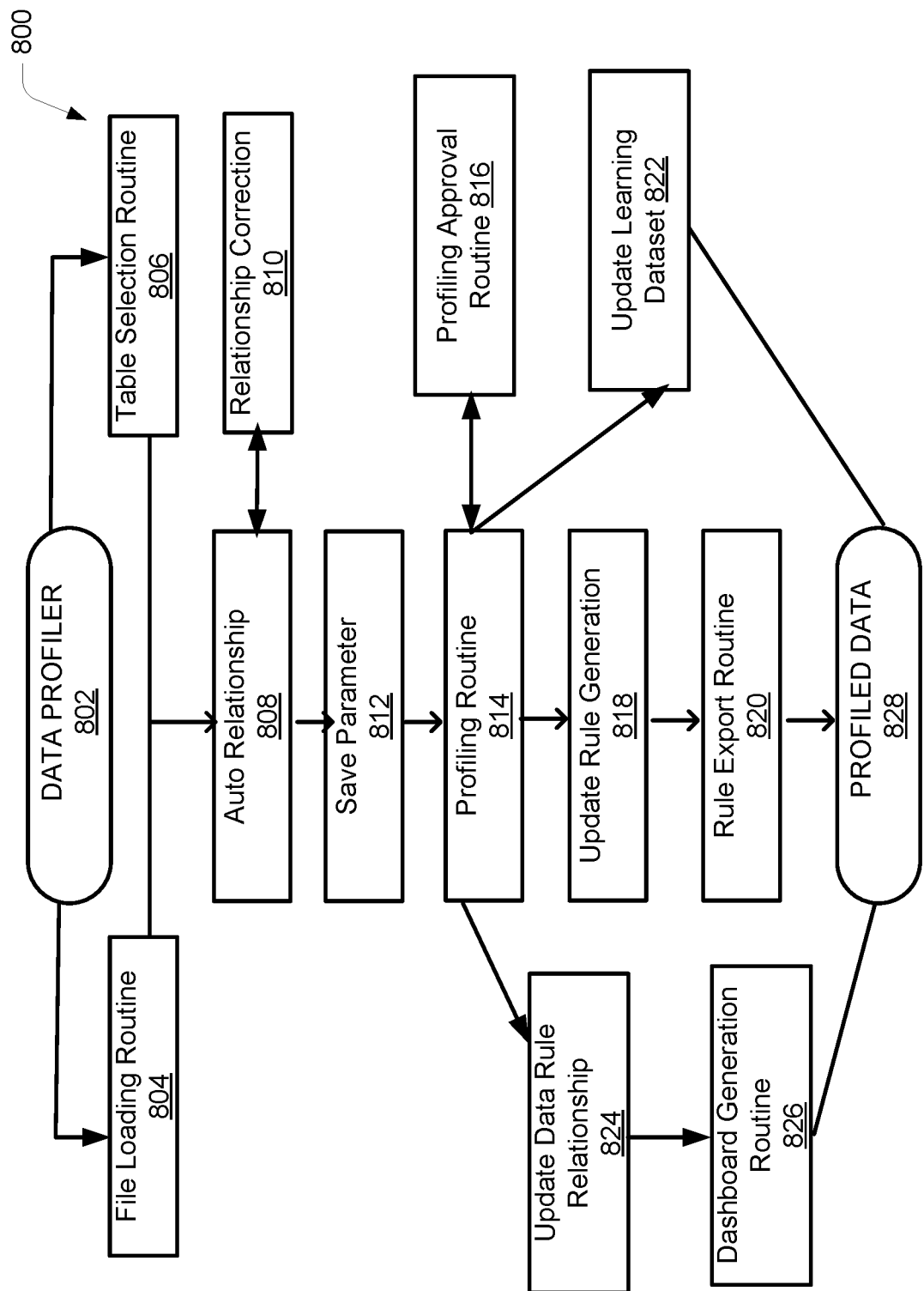
FIG. 8 illustrates a process flowchart for the intelligent data profiling, according to an example embodiment of the present disclosure.

FIG. 8 illustrates a process flowchart for a process 800 for the intelligent data profiling, according to an example embodiment of the present disclosure. The process 800 may be carried out by the data profiler 130, the data profiling component 310 or the data profiler 502. The process 800 may pertain to the generation of the data pattern model 225. The process 800 may include a data profiler 802. The data profiler 802 may be similar to the data profiler 130, the data profiling component 310 or the data profiler 502. The data profiler 802 may implement a file loading routine 804, and a table selection routine 806. In an example, the file loading routine 804, and the table selection routine 806 may be implemented by the capability P201 described above. In an example, the file loading routine 804 may be similar to the file loading routine 608. In an example, the table selection routine 806 may be similar to the table loading routine 610. The file loading routine 804, and the table selection routine 806 may lead to the generation of the relationships 808. The process 800 may implement the inspection 612 for a relationship correction 810 if it may be required (explained above in detail). The relationships 808 may lead to an identification of parameters 812, which may be stored by the system 110. The data profiler 802 may implement a profiling routine 814, and a profiling approval routine 816 on the parameters 812. In an example, the profiling routine 814 may be similar to the profiling routine 624 and may be implemented in the similar way as described above. In an example, the profiling approval routine 816 may be similar to the profiling approval routine 642 and may be implemented in the same way. As explained in detail by way of FIG. 6 the profiling routine 814 may lead to an update 818, pertaining to updating rules generated based on the parameters 812. The update 818 may be similar to the update 658. The update 818 may lead to the implementation of a rule export routine 820. The rule export routine 820 may be similar to the rule export routine 656. As explained in detail by way of FIG. 6 the profiling routine 814 may lead to an update 824, pertaining to updating data rule relationships generated based on the parameters 812. The update 824 may be similar to the update 662. The update 824 may lead to the implementation of a dashboard generation routine 826. The dashboard generation routine 826 may be similar to the dashboard generation routine 666. As explained in detail by way of FIG. 6 the profiling routine 814 may lead to an update 822, pertaining to updating learning set from dataset from where rules, relationships, tables may have been generated. The update 822 may be similar to the update 664. The dashboard generation routine 826, the rule export routine 820, and the update 824 may lead to a dataset 828. The dataset 828 may be the profiled data set obtained after implementation of various tools and techniques of the artificial intelligence component 215 on the target data 210.

Figure 9:
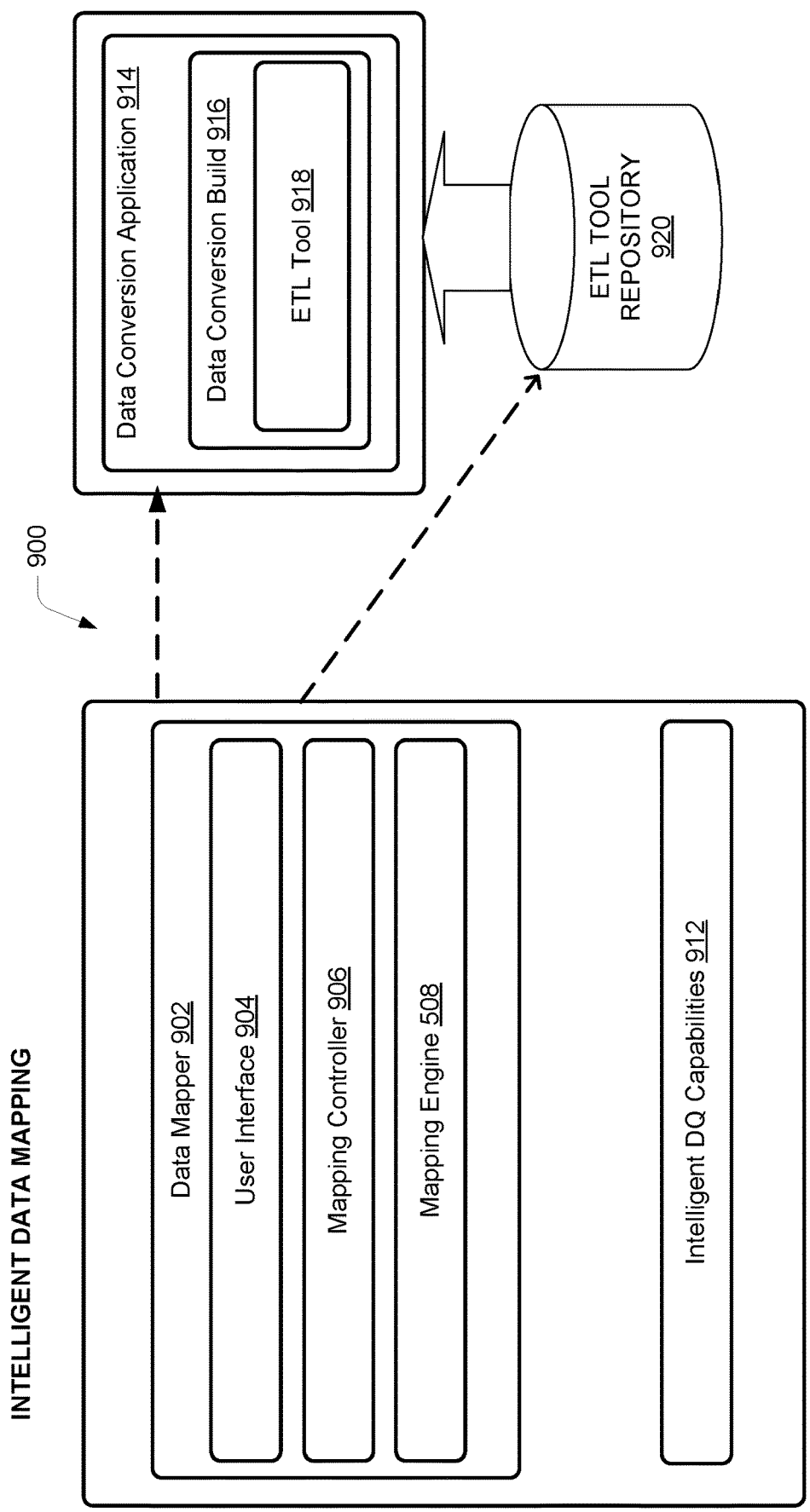
FIG. 9 illustrates a diagram of architectural details for the intelligent data mapping component of the intelligent data quality application, according to an example embodiment of the present disclosure.

FIG. 9 illustrates a diagram of architectural details for the intelligent data mapping component 312 of the intelligent data quality application 300, according to an example embodiment of the present disclosure. As mentioned above, the system 300 may be similar to the system 110. The intelligent data mapping component 312 may be similar to the data mapper 140. In accordance with an embodiment of the present disclosure, the intelligent data mapping component 312 may be illustrated as a data mapper 902. The data mapper 502 may include a user interface 904, a mapping controller 906, and a mapping engine 908. The data mapper 902 may be configured so that the functions carried out by the user interface 904, the mapping controller 906, and the mapping engine 908 may implement a set of intelligent data mapping capabilities 912. In an example, the set of intelligent data mapping capabilities 912 may include the first cognitive learning operation 230. In an example, the first cognitive learning operation 230 may be configured to implement data ingesting, data mapping, and key and value mapping for determination of the mapping context 235 and the conversion rule 240. In an example, the first cognitive learning operation 230 may implement techniques of machine learning thereby making the data mapper 902 a self-learning and updating mapper. The data profiler 502 may be configured present data processed after application of the set of AI tools and techniques described above to a data conversion application 914. The data conversion application 914 may include a module 916 for data conversion and a tool 918 for checking data quality. In an example, the tool 918 may be an extract, transform, load (ETL) tool. The data conversion application 914 may in communication with an ETL tool repository 920. In an example, the tool 918 may be identified from the ETL tool repository 920. In an example, the data quality application 514 may facilitate the system 110 in access the data quality and presenting the processed data to the user of the system 110. The data conversion application 914 may convert a user approved mapping in ETL job format using a direct repository dataset update.

As mentioned above, the first cognitive learning operation 230 may use various technical modules for the development of the mapping context 235 and the conversion rule 240. In an example, the set of intelligent data mapping capabilities 912 may include the technical modules, which may be deployed by the user interface 904, the mapping controller 906, and the mapping engine 508 for development of the mapping context 235 and the conversion rule 240. The user interface 904 may be a user interface to provide data mapping output, and capability for approving, rejecting and updating data analysis and accelerate the decision-making process for processing the data quality requirement 210. In accordance with an embodiment of the present disclosure the user interface, 904 may deploy a subset of intelligent data mapping capabilities from the set of the intelligent data mapping capabilities 912. The subset may include various intelligent data mapping capabilities, for example, a capability M201, a capability M202, a capability M203, a capability M204, and a capability M205. The capability M201 may relate to a mapping source selection pertaining to providing the capabilities to select source and target for mapping. The capability M202 may relate to relationship and content type details. The capability M202 may pertain to providing the capabilities to show the relationship and content type and allow a user to modify the same. The capability M203 may pertain to a mapping proposal. The mapping proposal may provide the capabilities to present the proposed mapping for the user. This capability may also provide the capabilities for the user to update the mapping. The capability M204 may pertain to a mapping approval. The mapping proposal may provide the capabilities to the user for approving and rejecting any identified/updated mapping. The capability M205 may pertain to a mapping result. The mapping result may provide a view of mapping result execution against sample dataset.

In accordance with an embodiment of the present disclosure, the mapping controller 906 may deploy a subset of intelligent data mapping capabilities from the set of the intelligent data mapping capabilities 912. The subset may include various intelligent data mapping capabilities, for example, a capability M301, and a capability M302. The capability M301 may pertain to a mapping a saving procedure. The saving procedure mapping may provide the capabilities to convert proposed mapping in ETL tool format and create an ETL Job automatically. The capability M302 may relate to a mapping conversion. The mapping conversion capability may provide the medium for the tool 918 to interact between the mapping engine 908 and the user interface 904. In an example, the capability M302 may update the ETL tool repository 920.

In accordance with an embodiment of the present disclosure the mapping engine, 508 may deploy a subset of intelligent data mapping capabilities from the set of the intelligent data mapping capabilities 912. The subset may include various intelligent data profiling capabilities, for example, a capability M101, a capability M102, a capability M103, and a capability M104. The capability M101 may relate to a mapping suggestion. The capability M101 may provide the capability for identifying potential data mapping between the provided source and selected target. The capability M102 may relate to a mapping saving function. The capability M102 may provide the capability for machine-learning and save defined mapping in the underlying dataset from approved, updated and rejected mapping. The capability M103 may relate to a mapping computation function. The capability M103 may provide the capabilities for executing dataset against the approved/saved mapping. The capability M104 may relate to a relationship and content component. The capability M104 may provide the capabilities for identifying and saving the relationship and content type. All capabilities described above may be utilized by the data mapper 902 in conjunction with the tool 918 for the generation of the mapping context 235 and conversion rule 240. The mapping engine 908 may adapt an algorithm to analyze the source and target structure with configuration data. The mapping engine 908 may use AI languages, tools and techniques for identifying the data mapping.

Figure 10:
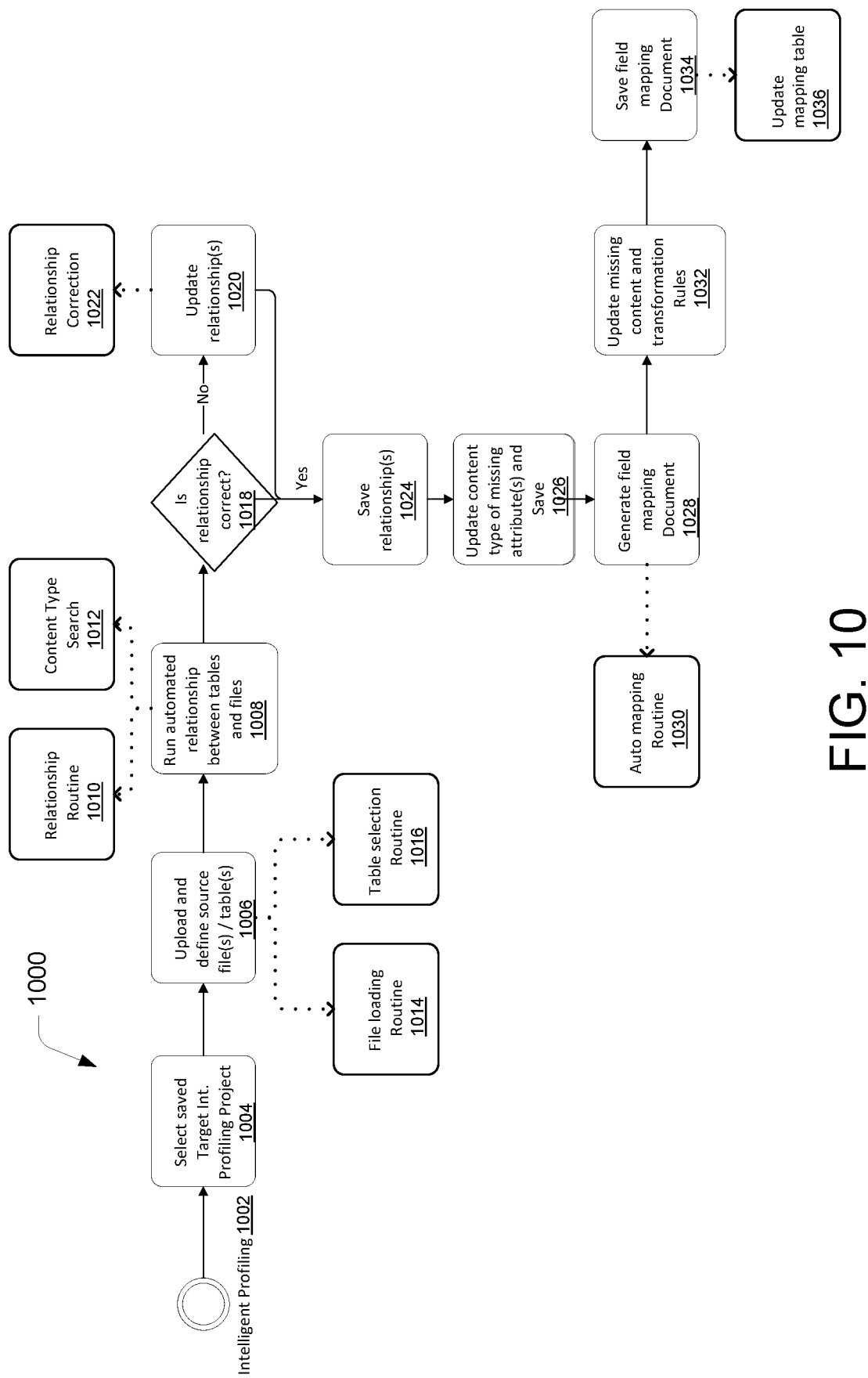
FIG. 10 illustrates a process flowchart for intelligent data mapping, according to an example embodiment of the present disclosure.

FIG. 10 illustrates a process flowchart for a process 1000 for the intelligent data mapping, according to an example embodiment of the present disclosure. The process 1000 may be carried out by the data mapper 140. The process 1000 may receive input from the data profiler 130 in form of a profiled set 1002. The process 1000 may implement a selection 1004 on the profiled set 1002 for selecting a target for mapping. The process 1000 may implement an upload 1006 on the selection 1004. The upload 1006 may be implemented through a file loading routine 1014, and a table selection routine 1016. The file loading routine 1014, and the table selection routine 1016 may be implemented by the capability M201 as described above. The upload 1006 may include dataset arranged in various rows, and tables. The process 1000 may perform an operation 1008 on the upload 1006. The operation 1008 may include running automated relationships between various rows, and tables from the upload 1006. The operation 1008 may be implemented through a relationship routine 1010 and a content type search 1012. The relationship routine 1010 and the content type search 1012 by the capability M202 and M104 as described above. The process 1000 may further include an inspection 1018 implemented by the first cognitive operation 230. The inspection 1018 may relate to examining the correctness of the relationship identified by the operation 1008. If the inspection 1018 may find the relationship identified by the operation 1008 to be incorrect, the process 1000 implements a relationship update 1020. The relationship update 1020 may lead to a relationship correction 1022. In an example, the correction 1022 may be implemented by the capability M202 as described above. The relationship correction 1022 may lead to a modification in the upload 1006 and the operation 1008. If the inspection 1018 may find the relationship identified by the operation 1008 to be correct, the process 1000 implements a relationship storage 1024. The process 1000 may implement an update 1026 on the relationship storage 1024. The update 1026 may pertain to updating content for any of the missing attributes which may be identified by the operation 1008. The update 1026 may lead to a generation 1028. In an example, the generation 1028 may be implemented through an auto mapping routine 1030. The automapping routine 1030 may be implemented by the capabilities M203, M205, M302, M101, and M102 as described above. The generation 1028 may lead to an update 1032. The update 1032 may pertain to updating any missing content or transformation rules as identified by the automapping routine 1030. The process may perform a storage operation 1034 on the document generated from the generation 1028 after implementation of the update 1032. The storage operation 1034 may further include updating mapping tables through an update 1036. The update 1036 may be implemented by the capabilities M204, M205, M301, and M102 as described above.

Figure 11:
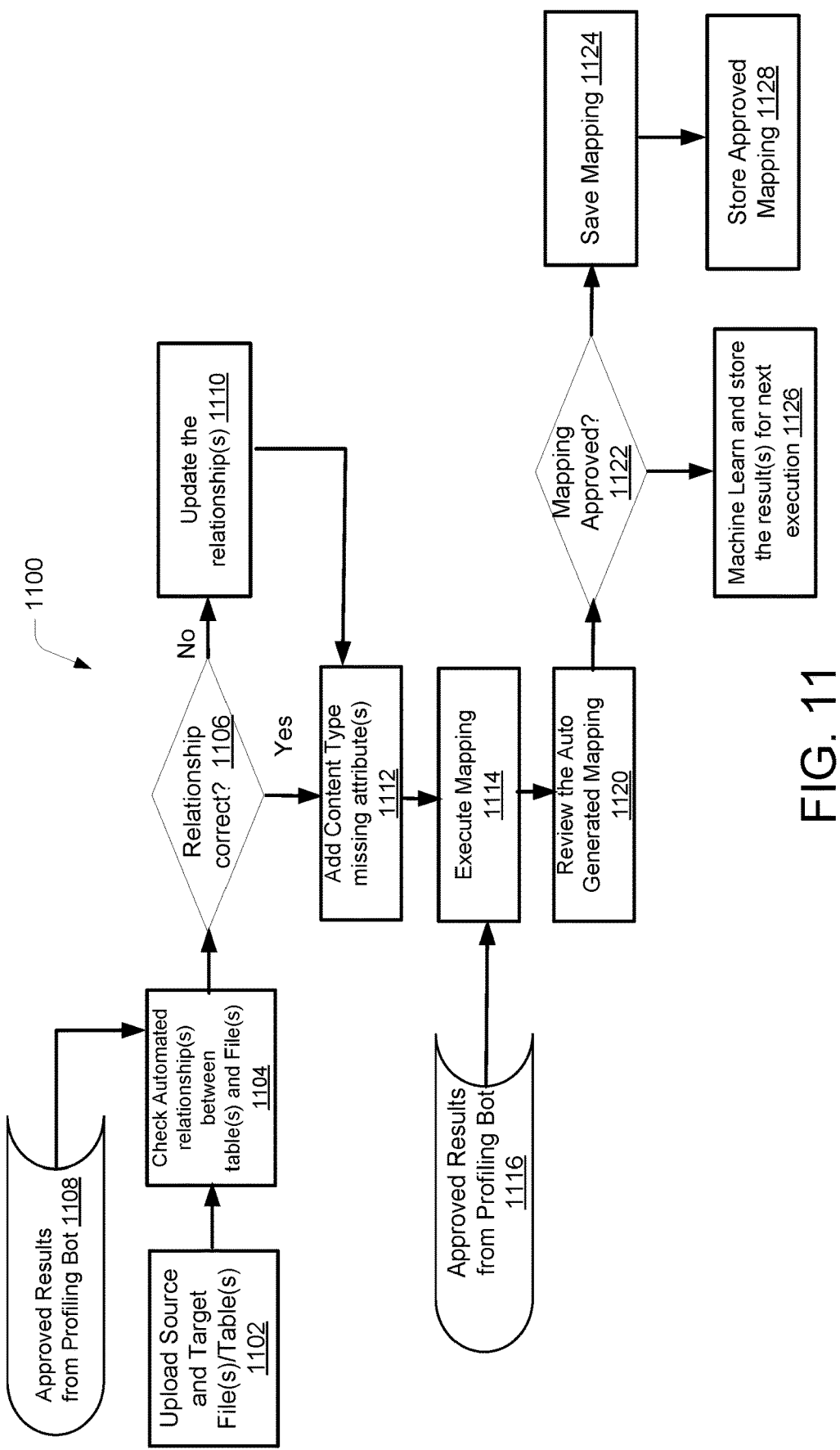
FIG. 11 illustrates a process flowchart for intelligent data mapping, according to an example embodiment of the present disclosure.

FIG. 11 illustrates process flowchart for a process 1100 for the intelligent data mapping, according to an example embodiment of the present disclosure. The process 1100 may be carried out by the data mapper 140. The process 1100 may include an uploading file component 1102. The uploading file component 1102 may be similar to the upload 1006. The uploading file component 1102 may lead to a check 1104. The check 1104 may receive input from the data profiler 130 in the form of approved profiling results 1108. The check 1104 may pertain to checking automated relationship(s) between the various table(s) and file(s) present in the uploading file component 1102. The process 1100 may perform an inspection 1106 implemented by the first cognitive operation 230. The inspection 1106 may relate to examining the correctness of the relationship identified by the check 1104. If the inspection 1106 may find the relationship identified by the check 1104 to be incorrect, the process 1100 implements a relationship update 1110. The relationship update 1110 may be similar to the update 1020. If the inspection 1106 may find the relationship identified by the check 1106 to be correct, the process 1100 may implement an update 1112. The update 1112 may be similar to the update 1026 and pertain to adding missing content identified by the inspection 1106. The process may implement an execution 1114 after the update 1026. The execution 1114 may be implemented through the input from the data profiler 130 in the form of approved profiling results 1116 (this may be similar to the approved profiling results 1108). The execution 1114 may lead to the generation of maps based on rules created by the check 1104 and reviewed by the inspection 1106. The process 1100 further includes a review of 1120. The review 1120 may review the maps generated by the execution 1114. The review 1120 may be followed by an inspection 1122. The inspection 1122 may pertain to approval of maps generated by the execution 1114 and presented for the review 1120. If the inspection 1122 may approve the maps generated by the execution 1114, the process 1100 may perform a storage operation 1124, thereby storing the maps generated thus far. If the inspection 1122 may reject the maps generated by the execution 1114, the process 1100 may execute a machine learning 1126. The machine learning 1126 may lead to updating the maps based in the review 1120 and the inspection 1122. The process 1100 may be used generation of the mapping context 235 and the conversion rule 240. In an example, the check 1104 may lead to the determination of the mapping context 235 and conversion rule 240.

Figure 12:
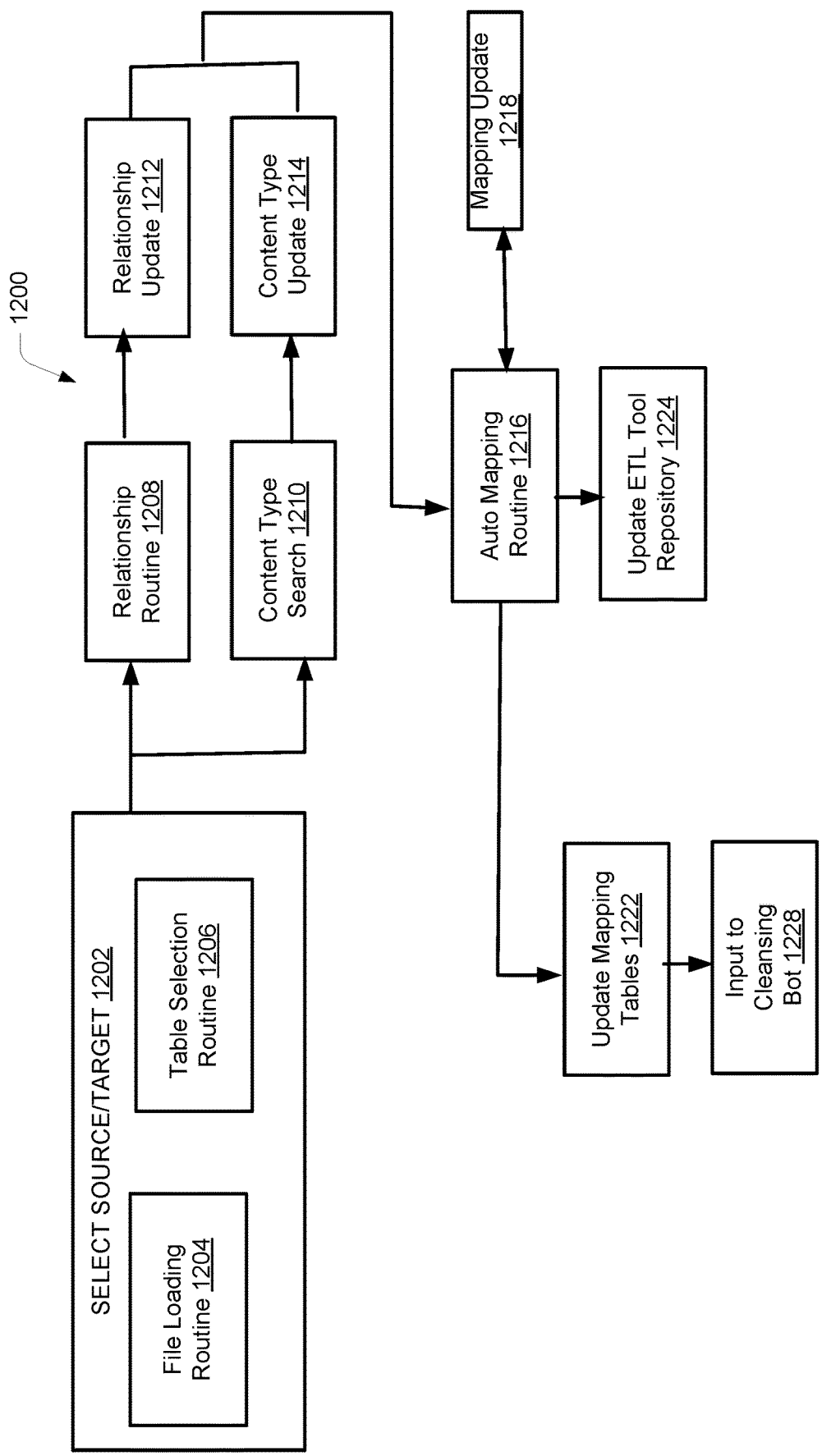
FIG. 12 illustrates a process flowchart for intelligent data mapping, according to an example embodiment of the present disclosure.

FIG. 12 illustrates process flowchart for a process 1200 for the intelligent data mapping, according to an example embodiment of the present disclosure. The process 1200 may be carried out by the data mapper 140. The process 1200 may pertain to generating of the mapping context 235 and the conversion rule 240. The process 1202 may include a selection 1202. The selection 1202 may include selecting a target for mapping. The selection 1202 may be similar to the selection 1004. The selection 1202 may implement a function similar to the upload 1006 for uploading the target for mapping onto the data mapper 140. The selection 1202 may be implemented through a file loading routine 1204, and a table selection routine 1206. The file loading routine 1204, and the table selection routine 1206 may be implemented by the capability M201 as described above. The file loading routine 1014 may be similar to the file loading routine 1014, and the table selection routine 1016 may be similar to the table selection routine 1016. The selection 1202 may include dataset arranged in various rows, and tables. The process 1200 may perform a relationship routine 1208 and a content type search 1210 on the selection 1202. The relationship routine 1208 and the content type search 1210 by the capability M202 and M104 as described above. In an example, the implementation of the relationship routine 1208 may lead to an update 1212. The update 1212 may be related to updating relationships between various rows and tables of data selected by the selection 1202. In an example, the content type search 1210 may lead to an update 1214. The update 1214 may be related to updating content or type of content selected by the selection 1202. In an example, the update 1214 may lead to a modification in the mapping context 235 based on modification in content chosen for mapping by the selection 1202. The process 1202 may implement an auto mapping routine 1216 based on results from the update 1212 and the update 1214. The auto mapping routine 1216 may lead to a mapping update 1218. The mapping update 1218 may include updating any mapping rules, relationships, identified thus far. The automapping routine 1216 may be implemented by the capabilities M203, M205, M302, M101, and M102 as described above. The auto mapping routine 1216 may lead to an update 1222. The update 1222 may include updating tables selected for mapping based on the selection 1202. The auto mapping routine 1216 may lead to an update 1224. The update 1224 may include updating the ETL tool repository 920. The update 1222 may provide input for the data cleanser 150. The process 1200 may be configured so that the update 1222 may provide data maps for processing the data quality requirement 210.

Figure 13:
FIG. 13 illustrates a process flowchart for a data cleansing component of the intelligent data quality application, according to an example embodiment of the present disclosure.

FIG. 13 illustrates a process flowchart for a data cleansing component of the intelligent data quality application, according to an example embodiment of the present disclosure. FIG. 13 illustrates the process flowchart for a process 1300 for intelligent data cleansing based on the intelligent data quality application 110, according to an example embodiment of the present disclosure. The process 1300 may deploy any of the components of the system 110. For the sake of brevity and technical clarity, any of the components of the system 110 are not explained here. In accordance with an embodiment of the present disclosure, the process 400 may include various steps carried out by the data cleanser 150 for cleansing data received from the plurality of data sources. In an example, the process 1300 may be carried out by the intelligent cleansing bot 314 on the data obtained from the source A dataset 302, the source B dataset 304, the source C dataset 306, and the source D dataset 308.

The process 1300 may include making a selection 1302. The selection 1304 may include selecting a profiling project. The selection 1302 may lead to a review 1304. The review 1304 may review any rules for data cleansing, which may have already been approved by the user. For example, the review 1304 may refer to the data profiling library. The process 1300 may include an application 1306 pertaining to applying intelligent cleansing operations on data received after the review 1304. The process 1300 may further include an analysis 1308 for analyzing results obtained from the application 1360

Figure 14:
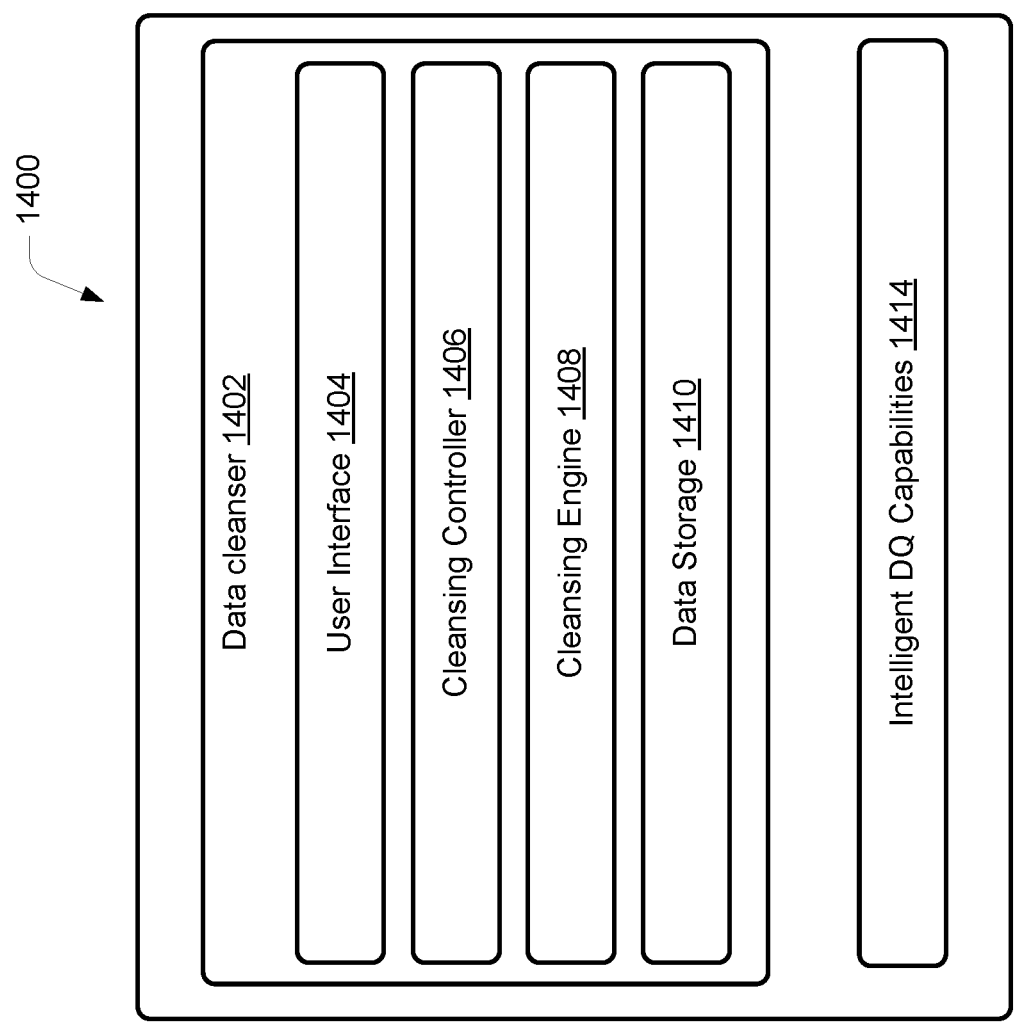
FIG. 14 illustrates a diagram of architectural details for the data cleansing component of the intelligent data quality application, according to an example embodiment of the present disclosure.

FIG. 14 illustrates a diagram of architectural details for a data cleanser 1402, according to an example embodiment of the present disclosure. The data cleanser 1402 may be similar to the data cleanser 150. The data cleanser 1402 may include a user interface 1404, a cleansing controller 1406, a cleansing engine 1408, and a data storage 1410. In an example, the data storage 1410 may be same as the staging dataset 318. The data cleanser 1402 may be configured so that the functions carried out by the user interface 1404, the cleansing controller 1406, the cleansing engine 1408, and the data storage 1410 may implement a set of intelligent data cleansing capabilities 1412. In an example, the set of intelligent data cleansing capabilities 1412 may include the second cognitive learning operation 245. In an example, the second cognitive learning operation 250 may be configured to implement data cleansing, key and value mapping for determination of the data harmonization model 245, and data cleansing (as mentioned above by way of FIG. 1 and FIG. 2). In an example, the second cognitive learning operation 250 may implement techniques of machine learning thereby making the data cleanser 1402 a self-learning and updating cleanser. As mentioned above, the second cognitive learning operation 250 may use various technical modules for the development of the data harmonization model 245 and the harmonized data set 260. In an example, the set of intelligent data cleansing capabilities 1412 may include the technical modules, which may be deployed by the user interface 1404, the cleansing controller 1406, and the cleansing engine 1408 for development of the data cascade 220 and the data pattern model 225.

The user interface 504 may be a user interface to enable to provide an auto cleansing output for organizational approval and further updating purposes. In accordance with an embodiment of the present disclosure the user interface 1404 may deploy a subset of the intelligent data cleansing capabilities from the set of the intelligent data cleansing capabilities 1412. The subset may include various intelligent data cleansing capabilities, for example, a capability C201, a capability C202, and a capability C203. The capability C201 may relate to cleansing a result display. The C201 capability may provide the capabilities to display the cleansing result assessed by the data cleanser 150. The C201 capability may facilitate users to review the auto cleansing results. The capability C202 may relate to cleansing a result update. The C202 capability may provide the capabilities may facilitate a user to update cleansing suggestions if required. The capability C203 may relate to cleansing a data export. The C203 capability may provide the capabilities may facilitate a user to download the cleansed/corrected data for further loading in the required system. The capabilities of the set of the intelligent data cleansing capabilities 1412 provided herein may be exemplary in nature and the data cleanser 1402 may deploy other capabilities similar to described above for carrying out various functions of the user interface 1404. In an example, the user interface 1404 may be deployed for obtaining consent from the user regarding aptness of the data harmonization model 245. The user interface 1404 may also be used to obtain a feedback from the user regarding the generation of the data harmonization model 245 and the harmonized dataset 260.

In accordance with an embodiment of the present disclosure, the cleansing controller 906 may deploy a subset of intelligent data cleansing capabilities from the set of the intelligent data cleansing capabilities 1412. The subset may include various intelligent data cleansing capabilities, for example, a capability C301. The capability C301 may include cleansing an output conversion. The capability C301 may convert the cleansing engine output to user understandable format and work as an interaction platform between engine and user interface.

In accordance with an embodiment of the present disclosure the cleansing engine, 1408 may deploy a subset of intelligent data cleansing capabilities from the set of the intelligent data cleansing capabilities 1412. The subset may include various intelligent data cleansing capabilities, for example, a capability C101. The capability C101 may capture the results from earlier profiling and propose a suggestion for cleansing/corrected data. The cleansing engine 1408 may adapt an algorithm to generate the corrected/cleanse output in the form of the data harmonization model 245. The cleansing engine 1408 may process the profiled output and predict cleanse data using various machine learning and artificial intelligence algorithms. The output from the data cleanser 1402 may form the harmonized dataset 260.

Figure 15:
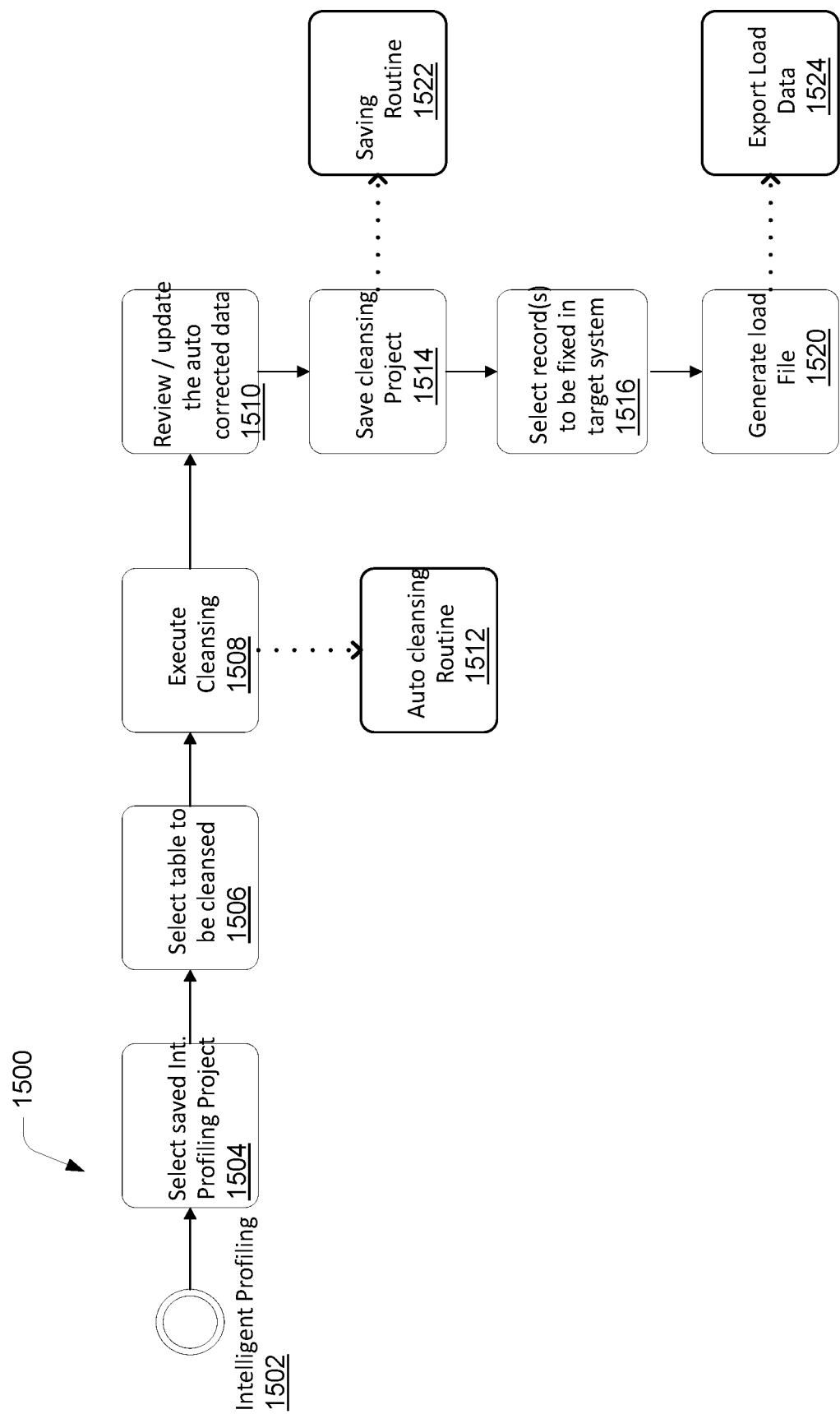
FIG. 15 illustrates a process flowchart for the data cleansing component, according to an example embodiment of the present disclosure.

FIG. 15 illustrates a process flowchart for a process 1500 for the data cleansing component 150, according to an example embodiment of the present disclosure. The process 1500 may receive input from the data profiler 130 in the form of a set of profiled data 1502. The process 1500 implements a selection 1504. The selection 1504 may include the profiled data 1502, which may need to be cleaned and harmonized for processing the data quality requirement 210. The selection 1504 may lead to a selection 1506. The selection 1506 may pertain to a specific table from the selection 1504, which may need to be cleaned. The process 1500 may implement an execution 1508. The execution 1508 may include execution of a cleansing operation on the selection 1506. The execution 1508 may be implemented through an auto cleansing routine 1512. The auto cleansing routine 1512 may be a part of the second cognitive learning operation 250. In an example, the auto cleansing routine 1512 may be implemented through the capability C101 and C301 as described above. The execution 1508 may lead to a review 1510. The review 1510 may include reviewing and updating any auto corrected data identified by the auto cleansing routine 1512. The process 1500 may implement a storage operation 1514 for storing a result set from the review 1510. The storage operation 1514 may be implemented through a saving routine 1522. The saving routine 1522 may be a part of the second cognitive learning operation 250. The saving routine 1522 may be implemented through the capability of C201 and C102 as described above. The process may further implement a selection 1516 after the storage operation in 1514. The selection 1516 may include selecting a set of data records, which may need to be fixed in the target dataset. As mentioned above, the system 110 may be configured to model and update data for effective data cleansing, therefore the data cleanser 150 may be configured to perform cleansing operations of the finalized target data. The selection 1516 may lead to a generation 1520. The generation 1520 may be related to generation if the output file or the data cleansing result 255. The generation 1520 may be implemented through an export load routine 1524 of the second cognitive learning operation 250. The export load routine 1524 may be implemented through the capability C203 as described above.

Figure 16:
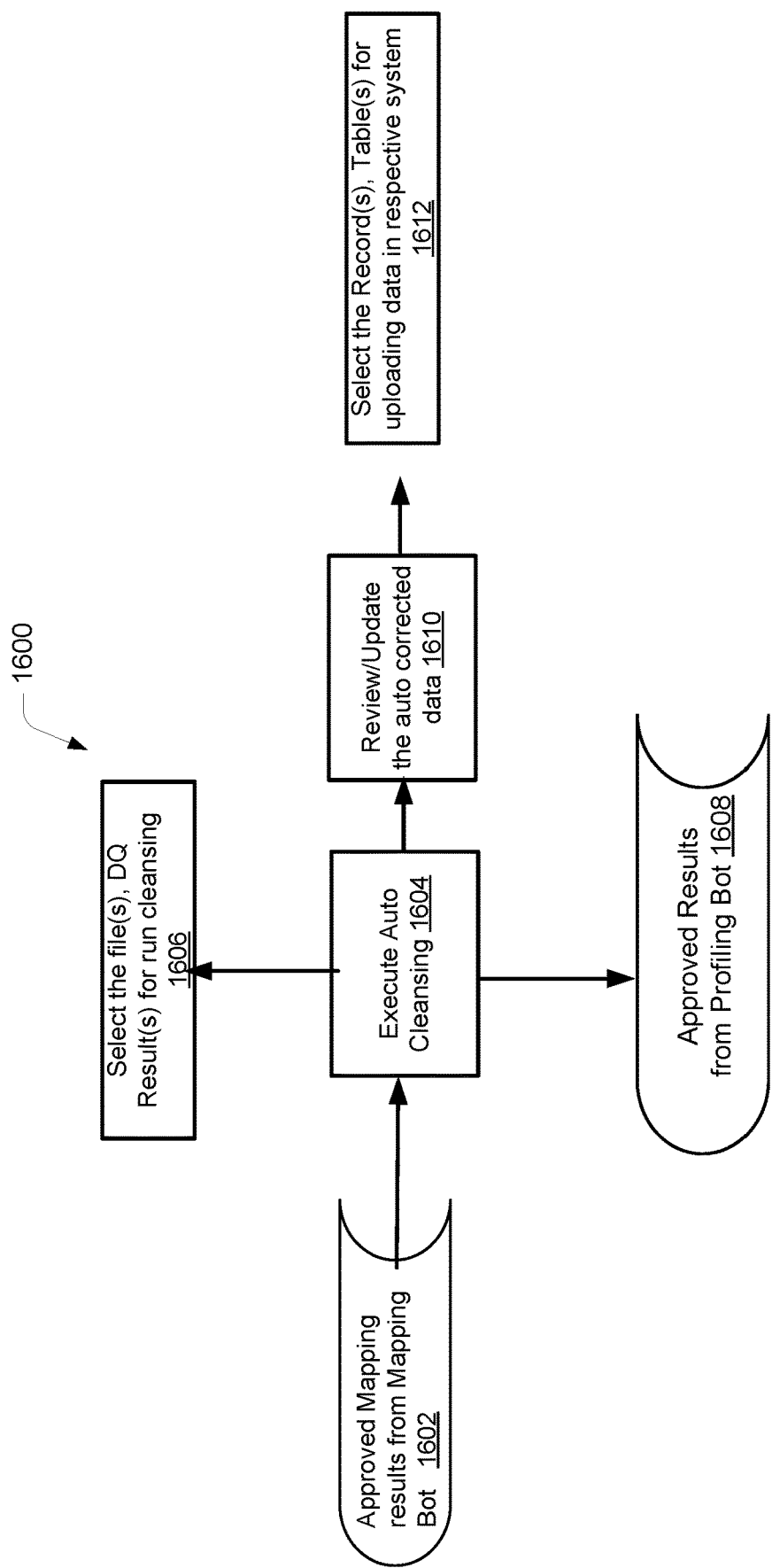
FIG. 16 illustrates a process flowchart for the data cleansing component, according to an example embodiment of the present disclosure.

FIG. 16 illustrates process flowchart for a process 1600 for the data cleansing component of the system 110, according to an example embodiment of the present disclosure. As mentioned above, the data cleanser 150 may receive input from the data profiler 130 and the data mapper 140. The process 1600 may include the data cleanser receiving a set 1608 from the data profiler 130 and a set 1602 from the data mapper 140. The set 1608 may include a set of approved results from the source system data after application of the artificial intelligence component 215 by the data profiler 130. The set 1602 may include a set of approved results from the source system data after application of the first cognitive learning operation 230 by the data mapper 140. The process 1600 further includes implementing a selection 1606. The selection 1606 may include selecting files or results for running the cleansing operations from the set 1602, and the set 1608. The process 1600 may include an execution 1604. The execution 1604 may include executing auto cleansing routine 1512 on the selection 1606. The process 1600 further includes a review 1610. The review 1610 may include reviewing and updating any auto corrected data identified by the auto cleansing routine 1512. The review 1610 may be followed by a selection 1612. The selection 1612 may include selecting the Record(s), and Table(s) approved by the review 1610 for uploading the data in a respective system or the target dataset 316.

Figure 17:
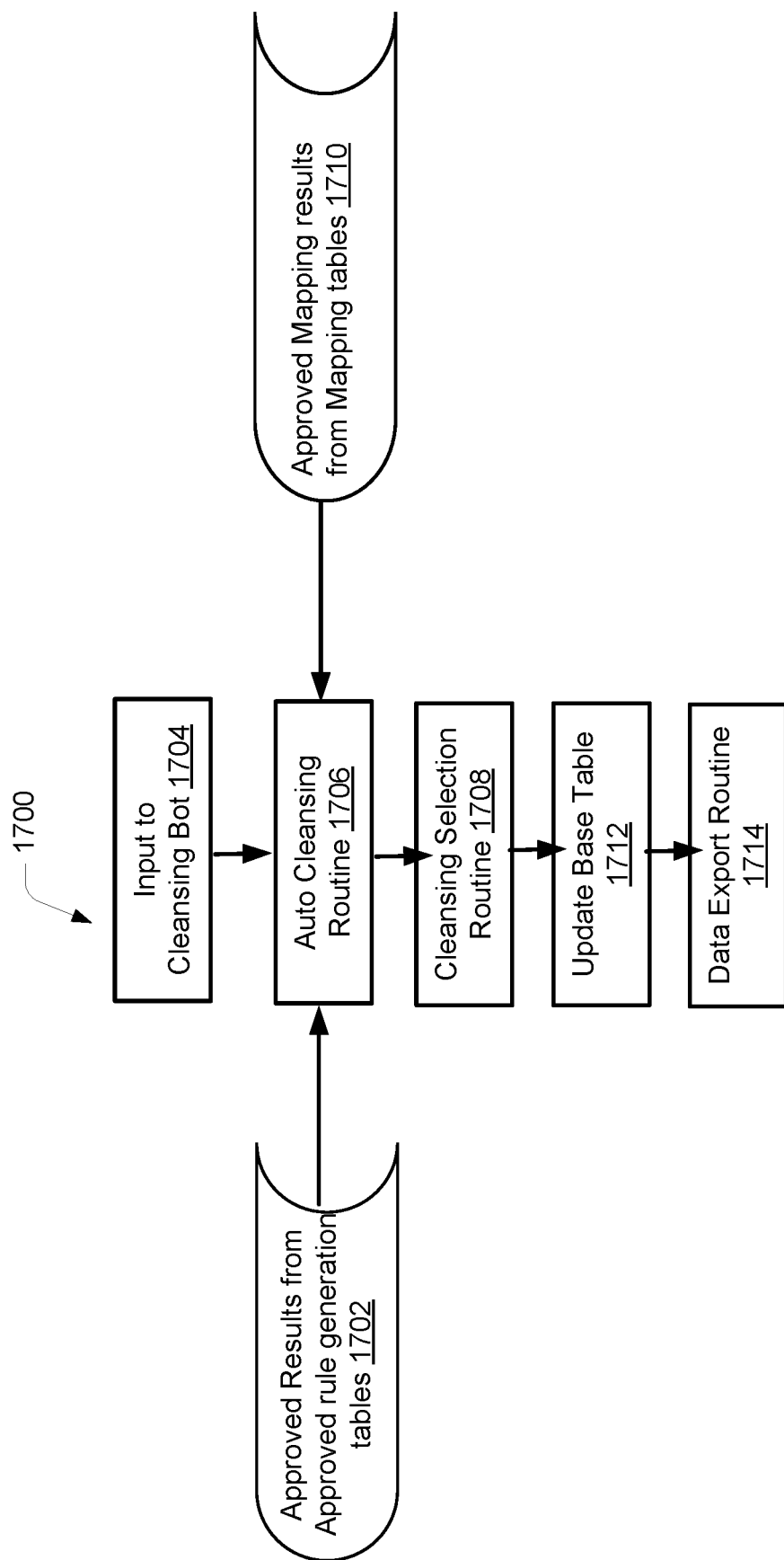
FIG. 17 illustrates a process flowchart for the data cleansing component, according to an example embodiment of the present disclosure.

FIG. 17 illustrates process flowchart for a process 1700 for the data cleansing component of the system 110, according to an example embodiment of the present disclosure. As mentioned above, the data cleanser 150 may receive input from the data profiler 130 and the data mapper 140. The process 1600 may include the data cleanser receiving a set 1702 from the data profiler 130 and a set 1710 from the data mapper 140. The set 1702 may include a set of approved results from the approved rule generation tables from the data pattern model 225. The process further includes receiving an input 1704 to the data cleanser 150. The input 1704 may be from a user of the system 110. The set 1702, the set 1710 and the input 1704 may be utilized by the data cleanser for implementing an auto cleansing routine 1706. The auto cleansing routine 1706 may be similar to the auto cleansing routine 1012 and may be implemented as described above. The auto cleansing routine 1706 may be followed by a cleansing selection routine 1708. The cleansing selection routine 1708 may be implemented through any of the capabilities described above including C201, C202, C203, C301, and C101. The cleansing selection routine 1708 may lead to an update 1712 in the tables selected for the auto cleansing routine 1706. The update 1712 may lead to a data export routine 1714. The data export routine 1714 may be similar to the export load routine 1524 and may be implemented through the capability C203 as described above.

Figure 18:
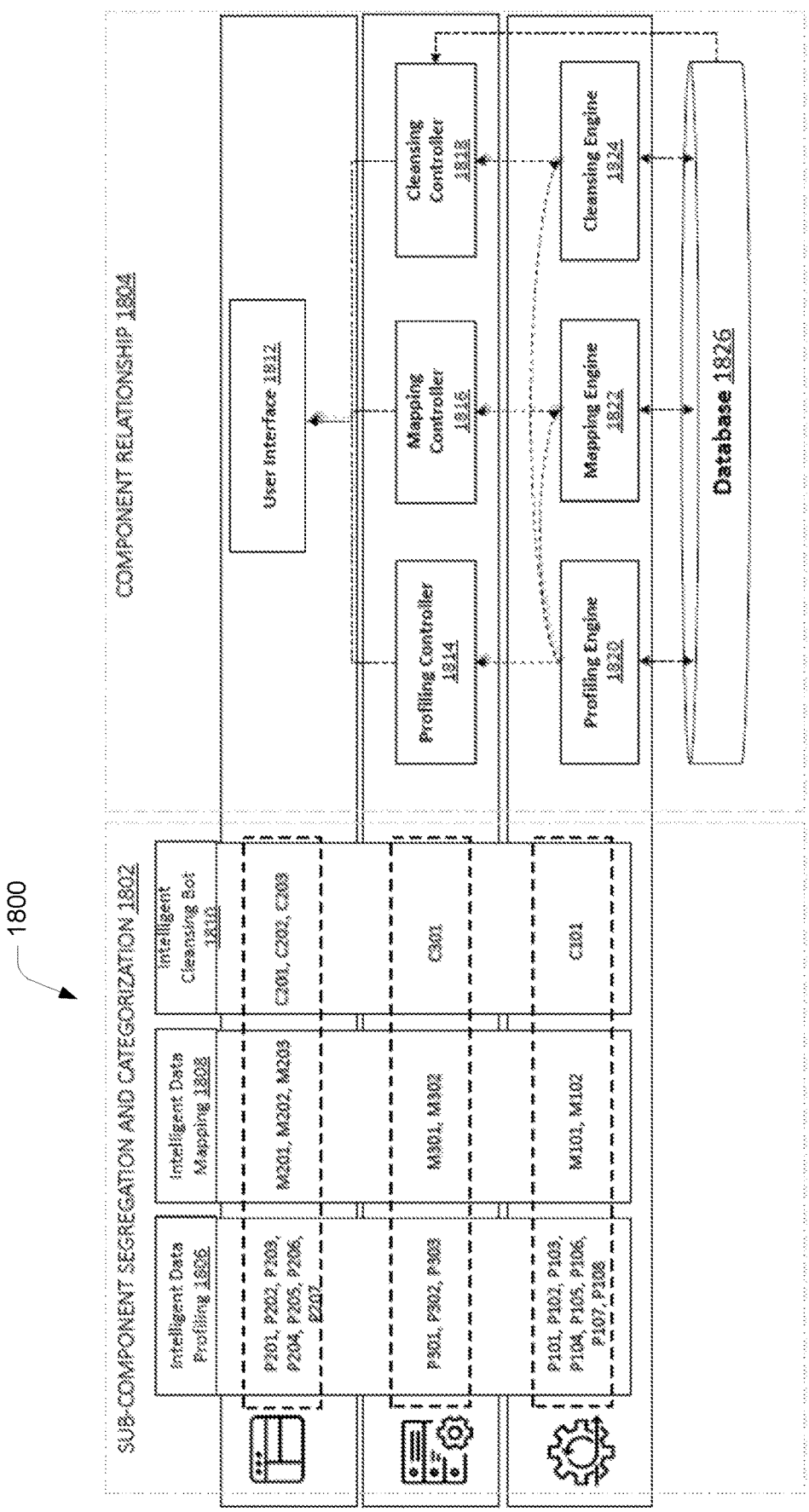
FIG. 18 illustrates a diagram depicting the relationship between various components of the intelligent data quality application, according to an example embodiment of the present disclosure.

FIG. 18 illustrates a flow-diagram 1800 depicting the relationship between various components of the intelligent data quality application 110, according to an example embodiment of the present disclosure. The flow diagram 1800 may be referred to as an integrated functional diagram of the system 110. The flow diagram 1800 illustrates a sub-component segregation and categorization 1802 of the system 110. The flow diagram 1800 illustrates a component relationship 1804 of the system 110. The sub-component segregation and categorization 1802 and the component relationship 1804 may together constitute the system 110. The sub-component segregation and categorization 1802 may include a data profiling component 1806, a data mapping component 1808 and a data cleansing bot 1810. Each of the data profiling component 1806, the data mapping component 1808 and the data cleansing bot 1810 may be linked to a user interface 1812. As mentioned above the user interface 1812 may be the user interface 504, the user interface 904, and the user interface 1404. In an example, the data profiling component 1806 may implement the capabilities P201, P202, P203, P204, P205, P206, and P207 using the user interface 1812. In an example, data mapping component 1808 may implement the capabilities M201, M202, and M203 using the user interface 1812. In an example, the data cleansing bot 1810 may implement the capabilities C201, C202, and C203 using the user interface 1812.

In accordance with an embodiment of the present disclosure, the user interface 1812 may be linked to a profiling controller 1814, a mapping controller 1816, and a cleansing controller 1818. In an example, the profiling controller 1814 may be the profiling controller 506, the mapping controller 1816 may be the mapping controller 906, and the cleansing controller 1818 may be the cleansing controller 1406. In an example, the data profiling component 1806 may implement the capabilities P301, P302, P303 using the profiling controller 1814. The data mapping component 1808 may implement the capabilities M301, and M302 using the mapping controller 1816. The data cleansing bot 1810 may implement the capabilities C301 using the cleansing controller 1818. The system 110 may further include a profiling engine 1820, a mapping engine 1822, and a cleansing engine 1824. The profiling engine 1820 may be linked to the profiling controller 1814. The mapping engine 1822 may be linked to the mapping controller 1816. The cleansing engine 1824 may be linked to the cleansing controller 1818.

The profiling engine 1820 may be the profiling engine 508. The mapping engine 1822 may be the mapping engine 908. The cleansing engine 1824 may be the cleansing engine 1408. The profiling component 1806 may implement the capabilities P101, P102, P103, P104, P105, P106, P107, and P108 using the profiling engine 1820. The data mapping component 1808 may implement the capabilities and M102 using the mapping engine 1822. The data cleansing bot 1810 may implement the capabilities C101 using the cleansing engine 1824. In an example, the profiling engine 1820 may be linked to the mapping engine 1822, and the cleansing engine 1824. Each of the profiling engine 1820, the mapping engine 1822, and the cleansing engine 1824 may be linked to a dataset 1826. In an example, the dataset 1826 may be the target structured dataset 316 described above.

It should be noted that all capabilities of the system 110 described herein may be exemplary in nature and should be treated as such. The system 110 may implement various tools and techniques pertaining to machine learning and artificial intelligence for achieving objectives the system 110.

Figure 19:
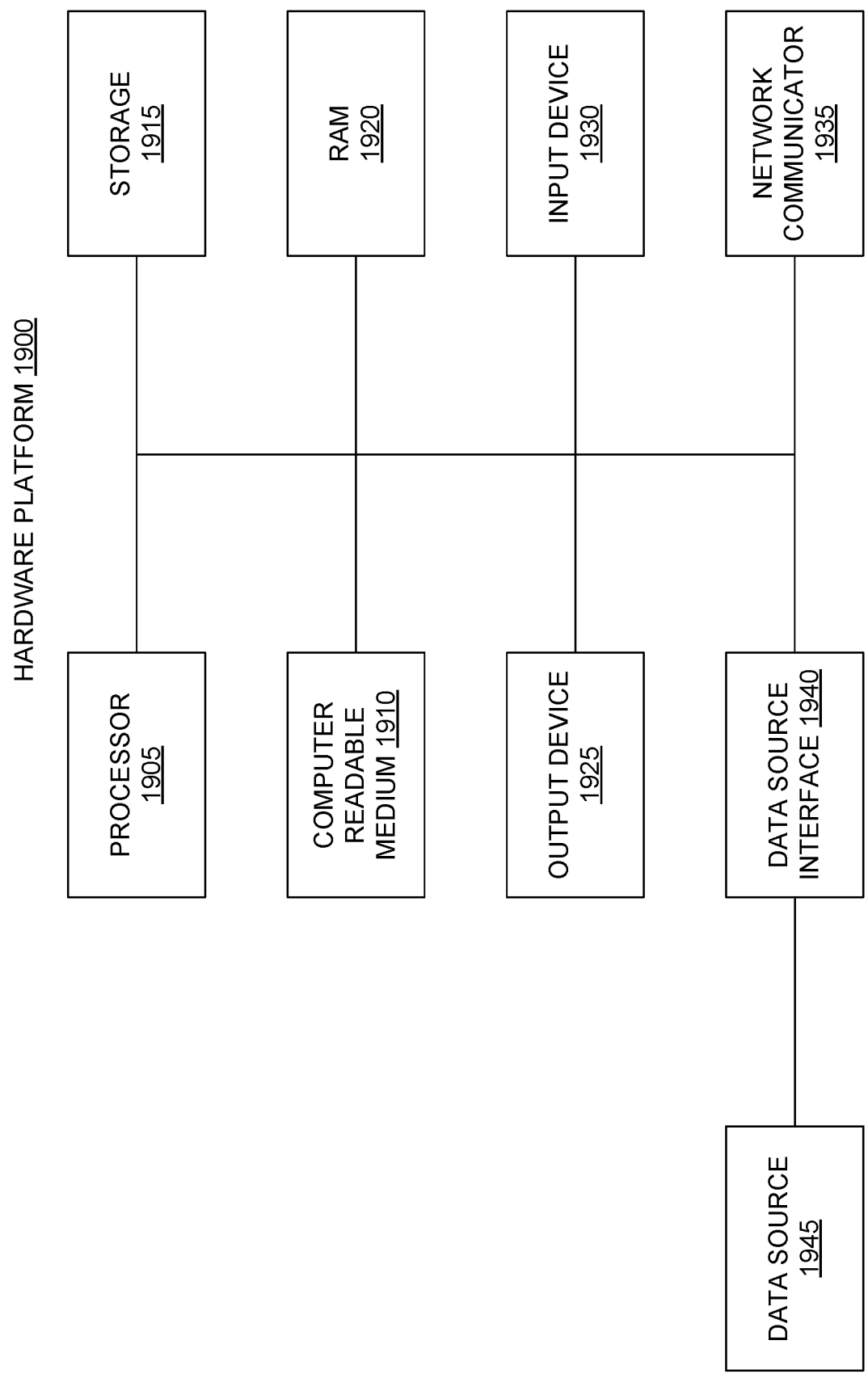
FIG. 19 illustrates a hardware platform for the implementation of an intelligent data quality system, according to an example embodiment of the present disclosure.

FIG. 19 illustrates a hardware platform 1900 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 1900. The hardware platform 1900 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 19, the hardware platform 1900 may be a computer system 1900 that may be used with the examples described herein. The computer system 1900 may represent a computational platform that includes components that may be in a server or another computer system. The computer system 1900 may execute, by a processor (e.g., a single or multiple processors) or other hardware processing circuit, the methods, functions and other processes described herein. These methods, functions and other processes may be embodied as machine-readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 1900 may include a processor 1905 that executes software instructions or code stored on a non-transitory computer-readable storage medium 1910 to perform methods of the present disclosure. The software code includes, for example, instructions to gather data and documents and analyze documents. In an example, the data profiler 130, the data mapper 140 and the data cleanser 150 may be software codes, tools or components performing these steps.

The instructions on the computer-readable storage medium 1910 are read and stored the instructions in storage 1915 or in random access memory (RAM) 820. The storage 1915 provides a large space for keeping static data where at least some instructions could be stored for later execution. The stored instructions may be further compiled to generate other representations of the instructions and dynamically stored in the RAM 1920. The processor 1905 reads instructions from the RAM 1920 and performs actions as instructed.

The computer system 1900 further includes an output device 1925 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1900 further includes input device 1930 to provide a user or another device with mechanisms for entering data and/or otherwise interact with the computer system 1900. The input device may include, for example, a keyboard, a keypad, a mouse, or a touchscreen. In an example, the output of the data mapper 140 is displayed on the output device 1925. Each of these output devices 1925 and input devices 1930 could be joined by one or more additional peripherals. In an example, the output device 1925 may be used to display the data cleansing result 255.

A network communicator 1935 may be provided to connect the computer system 1900 to a network and in turn to other devices connected to the network including other clients, servers, data stores, and interfaces, for instance. A network communicator 1935 may include, for example, a network adapter such as a LAN adapter or a wireless adapter. The computer system 1900 includes a data source interface 1940 to access data source 1945. A data source is an information resource. As an example, a dataset of exceptions and rules may be a data source. Moreover, knowledge repositories and curated data may be other examples of data sources. In an example, the data cascade 220 220 may be the data source 1945.

Figure 20A:
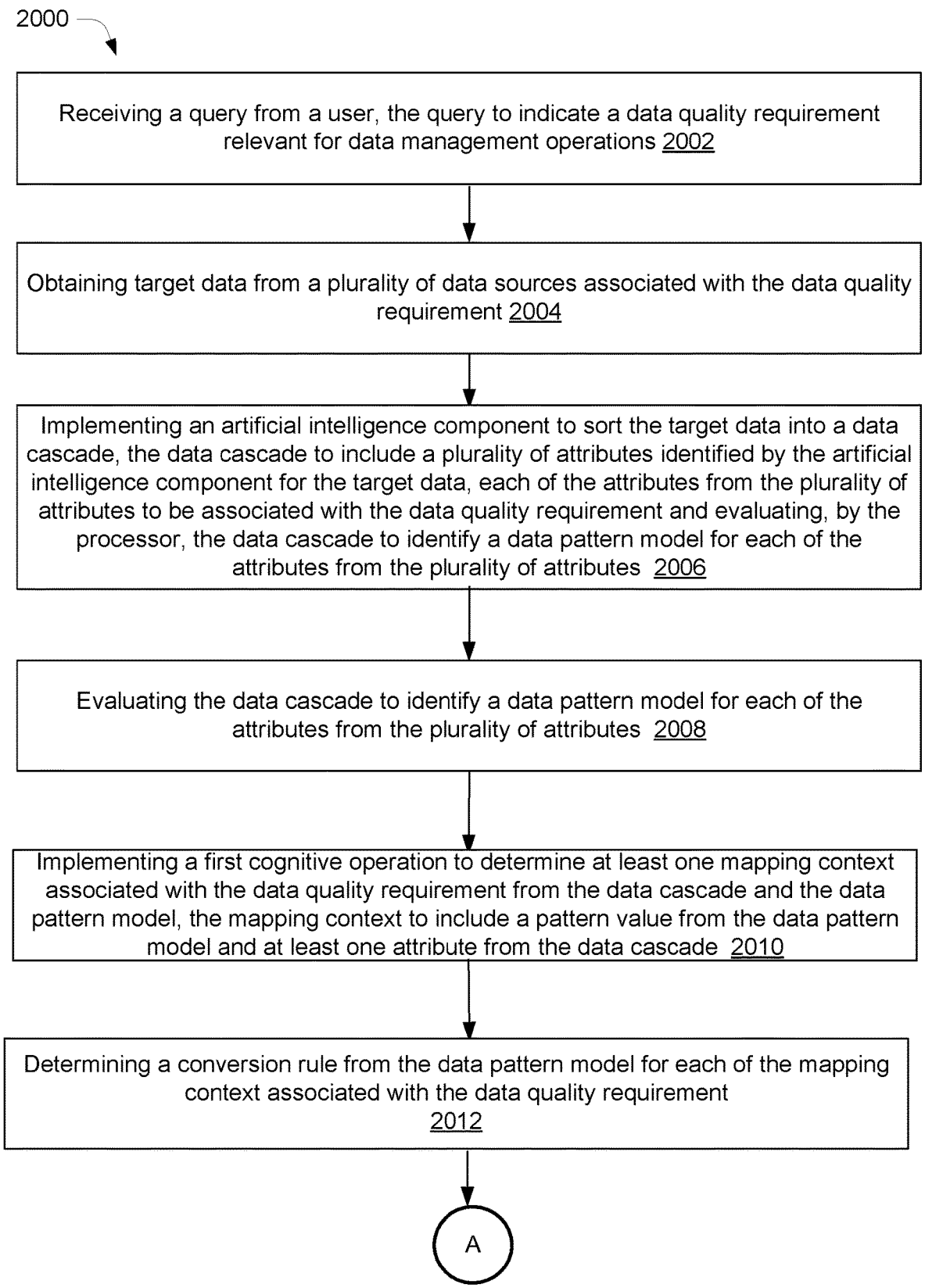
FIGS. 20A and 20B illustrate a process flowchart for an intelligent data quality application, according to an example embodiment of the present disclosure.
Figure 20B:
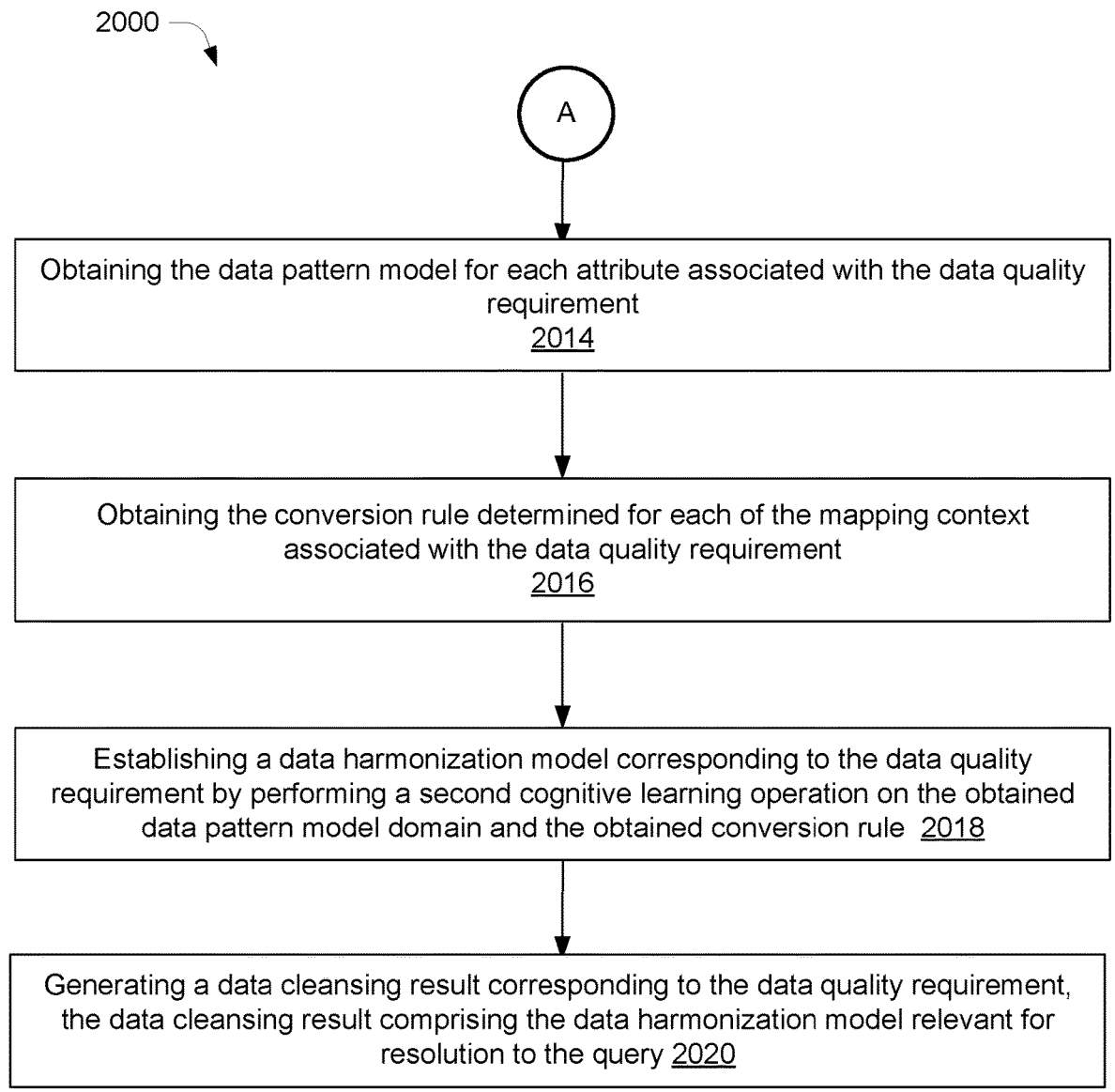

FIGS. 20A and 20B illustrate a process flowchart for an intelligent data quality application, according to an example embodiment of the present disclosure. FIGS. 20A and 20B illustrate a method 2000 for the intelligent data quality application 110 according to an example embodiment of the present disclosure. It should be understood that method steps are shown here for reference only and other combination of the steps may be possible. Further, the method 2000 may contain some steps in addition to the steps shown in FIG. 20. For the sake of brevity, construction and operational features of the system 110 which are explained in detail in the description of FIG. 1-FIG. 19 are not explained in detail in the description of FIGS. 20A and 20B. The method 2000 may be performed by a component of the system 110, such as the processor 120, the data profiler 130, the data mapper 140 and the data cleanser 150.

At block 2002, a query may be received from a user. The query may indicate a data quality requirement 205 associated with at least one of a process, an organization, and an industry relevant for data management operations.

At block 2004, target data 210 may be obtained from a plurality of data sources associated with the data quality requirement 205.

At block 2006, an artificial intelligence component 215 may be implemented sort the target data 210 into a data cascade 220, the data cascade 220 to include a plurality of attributes identified by the artificial intelligence component 215 for the target data 210, each of the attributes from the plurality of attributes to be associated with the data quality requirement 205.

At block 2008, the data cascade 220 may be evaluated to identify a data pattern model 225 for each of the attributes from the plurality of attributes. In an example, the artificial intelligence component 215 may be implemented for the evaluation.

At block 2010, a first cognitive learning operation 230 may be implemented to determine at least one mapping context 235 associated with the data quality requirement 205 from the data cascade 220 and the data pattern model 225. The mapping context 235 to include a pattern value 270 from the data pattern model 225 and at least one attribute from the data cascade 220.

At block 2012, a conversion rule 240 from the data pattern model 225 for each of the mapping context 235 associated with the data quality requirement 205 may be determined.

At block 2014, the data pattern model 225 for each attribute associated with the data quality requirement 205 may be obtained.

At block 2016, the conversion rule 240 determined for each of the mapping context 235 associated with the data quality requirement 205 may be obtained.

At bock 2018, a data harmonization model 245 may be established corresponding to the data quality requirement 205 by performing a second cognitive learning operation 250 on the obtained data pattern model 225 domain and the obtained conversion rule 240. In an example, the data harmonization model 245 may further include a harmonized dataset 260 comprising at least a part of the target data 210 from the plurality of sources collated through the implementation of the artificial intelligence component 215, the first cognitive learning operation 230, and the second cognitive learning operation 250. In an example, the data harmonization model 245 may further include a data harmonization index 265 indicative of a level of harmonization achieved in the at least a part of the target data 210 through the implementation of the artificial intelligence component 215, the first cognitive learning operation 230, and the second cognitive learning operation 250.

At block 2020, a data cleansing result 255 corresponding to the data quality requirement 205 is generated. The data cleansing result 255 may include the data harmonization model 245 relevant for a resolution to the query. In an example, the data cleansing result 255 may be generated as an electronic document in response to the query of the user. In an example, the method further comprises modifying any of the data pattern model 225, the conversion rule 240, and the data harmonization model 245 for obtaining the consent from the user.

In an example, the method 2000 may further comprise establishing a profiling library, by associating the plurality of attributes included in the data cascade 220, the mapping context 235 for each attribute, the conversion rule 240 for each mapping context 235, and the data harmonization model 245 with the data quality requirement 205. The method 2000 may comprise deploying the profiling library for validation of the data harmonization model 245.

In an example, the method 2000 may be practiced using a non-transitory computer-readable medium. In an example, the method 2000 may be a computer-implemented method.

The present disclosure provides for continuous collection and analysis of information and may also provide relevant recommendations on demand, allowing users to shift from event-based to continuous sourcing. The present disclosure may substantially reduce the time required in responding to market opportunities. The present disclosure for an intelligent data quality application 110 may eliminate substantial time spent on labor-intensive analysis, providing a huge boost in agility, responsiveness, and productivity.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a processor;
a data profiler coupled to the processor, the data profiler to:
receive a query from a user, the query to indicate a data quality requirement relevant for data management operations;
obtain target data from a plurality of data sources associated with the data quality requirement; and
implement an artificial intelligence component to:
sort the target data into a data cascade, the data cascade to include a plurality of attributes identified by the artificial intelligence component for the target data, each of the attributes from the plurality of attributes being associated with the data quality requirement, wherein the data cascade includes information about an attribute from the plurality of attributes that is linked to another attribute from the plurality of attributes in a sequential manner; and
identify a combination of attributes from the plurality of attributes for generating a data pattern model, the combination including at least one attribute usable for generating the data pattern model;

a data mapper coupled to the processor, the data mapper to:
  implement a first cognitive learning operation to:
    determine at least one mapping context associated with the data quality requirement from the data cascade and the data pattern model, the mapping context to include a pattern value from the data pattern model and at least one attribute from the data cascade; and
    determine a conversion rule from the data pattern model for each of the mapping context associated with the data quality requirement; and
a data cleanser coupled to the processor, the data cleanser to:
  obtain the data pattern model for each attribute associated with the data quality requirement;
  obtain the conversion rule determined for each of the mapping context associated with the data quality requirement;
  establish a data harmonization model corresponding to the data quality requirement by performing a second cognitive learning operation on the obtained data pattern model domain and the obtained conversion rule;
  determine a data harmonization index indicative of a level of harmonization achieved in the target data, wherein the data harmonization index provides a quantitative measure of the quality of target data achieved through the selection of the data pattern model, the conversion rule, and the data harmonization model;
  modify at least one of the data pattern model, the conversion rule, and the data harmonization model based on the data harmonization index; and
  generate a data cleansing result corresponding to the data quality requirement, the data cleansing result comprising the data harmonization model relevant for resolution to the query.

2. The system as claimed in claim 1, wherein the data cleansing result is generated as an electronic document in response to the query of the user.

3. The system as claimed in claim 1, wherein the system modifies any of the data pattern model, the conversion rule, and the data harmonization model for obtaining a consent from the user.

4. The system as claimed in claim 1, wherein the data harmonization model is to further include a harmonized dataset comprising at least a part of the target data from the plurality of sources collated through the implementation of the artificial intelligence component, the first cognitive learning operation, and the second cognitive operation.

5. The system as claimed in claim 1, wherein the data harmonization index indicates a level of harmonization achieved in the target data through the implementation of the artificial intelligence component, the first cognitive learning operation, and the second cognitive operation.

6. The system as claimed in claim 1, wherein the system is to further establish a profiling library, by associating the plurality of attributes included in the data cascade, the mapping context for each attribute, the conversion rule for each mapping context, and the data harmonization model with the data quality requirement.

7. The system as claimed in claim 6, wherein the system is to further deploy the profiling library for validation of the data harmonization model.

8. A method comprising:
  receiving, by a processor, a query from a user, the query being indicative of a data quality requirement for data management operations;
  obtaining, by the processor, target data from a plurality of data sources associated with the data quality requirement;
  implementing, by the processor, an artificial intelligence component to sort the target data into a data cascade, the data cascade to include a plurality of attributes identified by the artificial intelligence component for the target data, each of the attributes from the plurality of attributes being associated with the data quality requirement, wherein the data cascade includes information about an attribute from the plurality of attributes that is linked to another attribute from the plurality of attributes in a sequential manner;
  identifying a combination of attributes from the plurality of attributes for generating a data pattern model, the combination including at least one attribute usable for generating the data pattern model;
  implementing, by the processor, a first cognitive learning operation to determine at least one mapping context associated with the data quality requirement from the data cascade and the data pattern model, the mapping context to include a pattern value from the data pattern model and at least one attribute from the data cascade;
  determining, by the processor, a conversion rule from the data pattern model for each of the mapping context associated with the data quality requirement;
  obtaining, by the processor, the data pattern model for each attribute associated with the data quality requirement;
  obtaining, by the processor, the conversion rule determined for each of the mapping context associated with the data quality requirement;
  establishing, by the processor, a data harmonization model corresponding to the data quality requirement by performing a second cognitive learning operation on the obtained data pattern model domain and the obtained conversion rule;
  determining a data harmonization index indicative of a level of harmonization achieved in the target data, wherein the data harmonization index provides a quantitative measure of the quality of target data achieved through the selection of the data pattern model, the conversion rule, and the data harmonization model;
  modifying at least one of the data pattern model, the conversion rule, and the data harmonization model based on the data harmonization index; and
  generating, by the processor, a data cleansing result corresponding to the data quality requirement, the data cleansing result comprising the data harmonization model relevant for resolution to the query.

9. The method as claimed in claim 8, wherein the method further comprise generating the data cleansing result, by the processor, as an electronic document in response to the query of the user.

10. The method as claimed in claim 8, wherein the method further comprises modifying any of the data pattern model, the conversion rule, and the data harmonization model for obtaining a consent from the user.

11. The method as claimed in claim 8, wherein the data harmonization model is to further include a harmonized dataset comprising at least a part of the target data from the plurality of sources collated through the implementation of the artificial intelligence component, the first cognitive learning operation, and the second cognitive operation.

12. The method as claimed in claim 8, wherein the data harmonization index indicates a level of harmonization achieved in the target data through the implementation of the artificial intelligence component, the first cognitive learning operation, and the second cognitive operation.

13. The method as claimed in claim 8, wherein the method further comprises establishing a profiling library, by associating the plurality of attributes included in the data cascade, the mapping context for each attribute, the conversion rule for each mapping context, and the data harmonization model with the data quality requirement.

14. The method as claimed in claim 13, wherein the method further comprises deploying the profiling library for validation of the data harmonization model.

15. A non-transitory computer readable medium including machine readable instructions that are executable by a processor to:

receive a query from a user, the query being indicative of a data quality requirement associated with data management operations;

obtain target data from a plurality of data sources associated with the data quality requirement;

implement an artificial intelligence component to sort the target data into a data cascade, the data cascade to include a plurality of attributes identified by the artificial intelligence component for the target data, each of the attributes from the plurality of attributes being associated with the data quality requirement, wherein the data cascade includes information about an attribute from the plurality of attributes that is linked to another attribute from the plurality of attributes in a sequential manner;

identify a combination of attributes from the plurality of attributes for generating a data pattern model, the combination including at least one attribute usable for generating the data pattern model;

implement a first cognitive learning operation to determine at least one mapping context associated with the data quality requirement from the data cascade and the data pattern model, the mapping context to include a pattern value from the data pattern model and at least one attribute from the data cascade;

determine a conversion rule from the data pattern model for each of the mapping context associated with the data quality requirement;

obtain the data pattern model for each attribute associated with the data quality requirement;

obtain the conversion rule determined for each of the mapping context associated with the data quality requirement;

establish a data harmonization model corresponding to the data quality requirement by performing a second cognitive learning operation on the obtained data pattern model domain and the obtained conversion rule;

determine a data harmonization index indicative of a level of harmonization achieved in the target data, wherein the data harmonization index provides a quantitative measure of the quality of target data achieved through the selection of the data pattern model, the conversion rule, and the data harmonization model;

modify at least one of the data pattern model, the conversion rule, and the data harmonization model based on the data harmonization index; and generate a data cleansing result corresponding to the data quality requirement, the data cleansing result comprising the data harmonization model relevant for resolution to the query.

16. The non-transitory computer-readable medium of claim 15, wherein the processor is to generate the data cleansing result as an electronic document in response to the query of the user.

17. The non-transitory computer-readable medium of claim 15, wherein the processor is to modify any of the data pattern model, the conversion rule, and the data harmonization model for obtaining a consent from the user.

18. The non-transitory computer-readable medium of claim 15, wherein the data harmonization model is to further include a harmonized dataset comprising at least a part of the target data from the plurality of sources collated through the implementation of the artificial intelligence component, the first cognitive learning operation, and the second cognitive operation.

19. The non-transitory computer-readable medium of claim 15, wherein the data harmonization index is indicative of a level of harmonization achieved in the at least a part of the target data through the implementation of the artificial intelligence component, the first cognitive learning operation, and the second cognitive operation.

20. The non-transitory computer-readable medium of claim 15, wherein the processor is to further establish a profiling library, by associating the plurality of attributes included in the data cascade, the mapping context for each attribute, the conversion rule for each mapping context, and the data harmonization model with the data quality requirement.

* * * * *